US012784714B2

(12) United States Patent
Parker et al.

(10) Patent No.: US 12,784,714 B2
(45) Date of Patent: Nov. 3, 2026

(54) SONIC CHANNEL AND SKELETONIZED BRACING FOR THE SOUNDBOARD AND BACK OF A MUSICAL INSTRUMENT

(71) Applicant: Dreadnought, Inc., Wilmington, DE (US)

(72) Inventors: Joshua H. Parker, Easton, PA (US); Daniel G. Hingston, Bath, PA (US); Brent M. Williams, Easton, PA (US)

(73) Assignee: Dreadnought, Inc., Wilmington, DE (US)

( * ) Notice: Subject to any disclaimer, the term of this patent is extended or adjusted under 35 U.S.C. 154(b) by 404 days.

(21) Appl. No.: 18/386,437

(22) Filed: Nov. 2, 2023

(65) Prior Publication Data

US 2024/0242698 A1 Jul. 18, 2024

Related U.S. Application Data

(63) Continuation-in-part of application No. 18/098,425, filed on Jan. 18, 2023.

(51) Int. Cl.

| | |
|---|---|
| ***G10D 3/02*** | (2006.01) |
| ***G10D 1/08*** | (2006.01) |
| ***G10D 3/22*** | (2020.01) |

(52) U.S. Cl.
CPC ................. *G10D 3/02* (2013.01); *G10D 1/08* (2013.01); *G10D 3/22* (2020.02)

(58) Field of Classification Search
CPC .. G10D 3/02; G10D 1/08; G10D 3/22; G10D 3/00; G10D 1/00
See application file for complete search history.

(56) References Cited

U.S. PATENT DOCUMENTS

| | | | | |
|---|---|---|---|---|
| 6,011,205 | A * | 1/2000 | Tucker | G10D 3/22 84/290 |
| 6,759,581 | B2 | 7/2004 | Taylor | |
| RE42,630 | E | 8/2011 | Kroeger et al. | |
| 8,294,010 | B2 | 10/2012 | Gillett | |
| 8,450,587 | B2 | 5/2013 | Mcpherson | |
| 9,000,282 | B1 | 4/2015 | Booth | |
| 9,171,528 | B2 | 10/2015 | Seal | |
| 9,502,006 | B1 | 11/2016 | Galloup | |

(Continued)

FOREIGN PATENT DOCUMENTS

| | | | | |
|---|---|---|---|---|
| JP | 2008052054 | A | 3/2008 | |
| WO | WO-03054850 | A2 * | 7/2003 | G10D 3/02 |

OTHER PUBLICATIONS

Design Innovations, Ryan Guitars Bracing Description, http://ryanguitars.com/design-innovations, 1 page Nov. 11, 2022.

*Primary Examiner* — Kimberly R Lockett
(74) *Attorney, Agent, or Firm* — Armstrong Teasdale LLP

(57) ABSTRACT

A musical instrument having a body defining a sound chamber for the musical instrument. The body has a soundboard, a back, and a lateral sidewall connecting the soundboard and the back. The soundboard includes multiple braces with at least one brace skeletonized, and a first sonic channel having a plurality of substantially polygonal-shaped sections and bounding the at least one skeletonized brace. The back includes multiple back braces with at least one back brace skeletonized, and a second sonic channel having a plurality of substantially polygonal-shaped sections and bounding the at least one skeletonized back brace. The musical instrument may be a guitar.

20 Claims, 18 Drawing Sheets

(56) References Cited

U.S. PATENT DOCUMENTS

| | | | |
|---|---|---|---|
| 9,519,733 | B2 | 12/2016 | Summit |
| 9,520,108 | B1 | 12/2016 | Powers |
| 10,074,348 | B2 | 9/2018 | Seal |
| 10,262,633 | B2 | 4/2019 | Powers |
| 10,311,837 | B1 | 6/2019 | Zaret et al. |
| 10,614,783 | B2 | 4/2020 | Kilpatrick et al. |
| 10,803,840 | B1 | 10/2020 | Greene et al. |
| 10,902,826 | B1 | 1/2021 | Brock |
| 11,049,479 | B1 | 6/2021 | Schanck |
| 11,217,213 | B2 | 1/2022 | Greene et al. |
| 11,620,969 | B1 | 4/2023 | Hernandez |
| 2013/0255466 | A1 | 10/2013 | McPherson |
| 2022/0108671 | A1 | 4/2022 | Dickinson et al. |

* cited by examiner

SONIC CHANNEL AND SKELETONIZED BRACING FOR THE SOUNDBOARD AND BACK OF A MUSICAL INSTRUMENT

RELATED APPLICATION

This application claims the benefit of priority as a continuation-in-part application to U.S. patent application Ser. No. 18/098,425, filed on Jan. 18, 2023, the contents of which are incorporated in this application by reference.

TECHNICAL FIELD

The present invention relates generally to a stringed musical instrument such as a guitar and, more specifically, to a body of the instrument that includes a sonic channel, skeletonized bracing, or both a sonic channel and skeletonized bracing.

BACKGROUND OF THE DISCLOSURE

Music plays an important role in our daily lives and is woven into the fabric of society. Many people perform music as a pastime, a hobby, or an occupation. One of the main divisions of instruments, chordophone instruments are musical instruments that make sound by way of a vibrating string or strings stretched between two points. Chordophone instruments, and in particular stringed musical instruments, are very popular worldwide because they are versatile and suited to different genres of music. The most popular of the stringed musical instruments is probably the modern guitar, including both acoustic guitars which project sound acoustically and electric guitars which project sound through electrical amplification.

Conventional acoustic and electric guitars include a body and a neck that is attached to the body via a joint, with one or more elongate, flexible strings extending between the body and a distal end of the neck along a fretboard. (The terms “distal” or “distal end” are used to define the part or surface of an element which is positioned furthest from the user.) Typically made from wood, the body has a back, a top called a soundboard that vibrates when the instrument is played, and a sidewall connecting the back and the top. The guitar top includes a sound hole, a neck end that is configured for attachment to the guitar neck with a longitudinal axis, a heel end, a transverse axis normal to the longitudinal axis, and a bottom surface.

As is well known in the art, the primary quality characteristics of guitars are tone (i.e., the audible nature of the instrument including volume, brightness, evenness, note separation, etc.), playability (i.e., the responsiveness of the instrument to the technique of the player), and durability or sustain (i.e., the ability of the instrument to deliver tone and playability over time). This document focuses on the tone and sustain of an instrument such as a guitar. With respect to tone, the transfer of vibrations is critical to the tone or sound of a guitar. The term “sustain” is intended to mean a measure of musical sound over time. More particularly, sustain refers to the period of time that the sound of the guitar continues until it becomes inaudible.

U.S. Pat. No. 6,759,581 issued to Taylor-Listug, Inc. and titled “Acoustic Stringed Instrument Body with Relief Cut” attempts to improve the tonal quality of an acoustic stringed instrument. As the title implies, provided is an acoustic stringed instrument body including a soundboard with a symmetrical relief cut around its periphery. The relief cut is located on the exterior or interior surface of the soundboard close to the perimeter of that surface. The relief cut may be in other locations, however, including closer to the sound hole. The relief cut ostensibly forms a more flexible coupling between the soundboard and the sidewall of the instrument, which is represented to improve the tone of the instrument by allowing the soundboard to vibrate more freely. The relief cut in the soundboard is also represented to permit stretching and contraction of the wooden soundboard due to changes in atmospheric conditions.

Referring to FIG. 1 of the ’581 patent, a dotted line 45 which follows the contour of the soundboard 30 is present inside of the perimeter of the soundboard 30. This dotted line 45 represents the general location of relief cuts 100, 110, 120, 130, 140, and 150, which are located on the soundboard 30. The cross-sectional area of the relief cut 100 may be varied along the soundboard 30, and the relief cut 100 may also have differing shapes and dimensions.

The bodies of instruments such as flat top guitars commonly include a round or oval shaped sound hole in the guitar top, beneath the strings and in front of the bridge or point of attachment for the strings. The sound hole creates a structurally weak spot allowing string tension to create physical distortions in the body of the guitar, potentially rendering the guitar non-functional. Structural members, such as braces, are required to counteract this deformation. In addition to counteracting deformation from string tension, the structural members are required to conduct and distribute vibration from the strings to assist in even vibration of the resonant chamber, or body, of the guitar. The various characteristics (e.g., number, shape, size, and position) of structural braces have been the subject of much development.

FIG. 7 of U.S. Pat. No. 11,217,213 issued to the assignee of the present application, Dreadnought, Inc. (a wholly owned subsidiary of C. F. Martin & Co., Inc.), illustrates just one example of bracing suitable for the soundboard of a guitar. In the example shown, the soundboard is braced using the X-brace system, or a variation of the X-brace system, generally attributed to Christian Frederick Martin between 1840 and 1845 for use in gut string guitars. The system consists of two braces forming an “X” shape across the soundboard below the top of the sound hole. The lower arms of the “X” straddle and support the ends of the bridge. Under the bridge is a bridge patch (typically hardwood) which prevents the ball end of the strings from damaging the underside of the soundboard. Below the bridge patch are one or more tone bars which support the bottom of the soundboard. The tone bars abut one of the X braces and usually slant down towards the bottom edge of the soundboard. The top tone bar butts against a portion of the bridge patch in most instruments. On either side of the sound hole are angled braces that vertically span the horizontal transition between the upper bout and the lower bout of the soundboard. Around the lower bout, small finger braces support the area between the X-braces and the edge of the soundboard.

U.S. Pat. No. 9,520,108 issued to Taylor-Listug, Inc. discloses internal bracing for a guitar. The bottom surface of the guitar top includes a pair of longitudinal braces that are attached to the surface. The pair of longitudinal braces extend primarily along the longitudinal axis from the heel end toward the neck end and terminate at a point beyond the sound hole toward the neck end. Each of the longitudinal braces is positioned on an opposing side of the sound hole such that a distance between the longitudinal braces exceeds the diameter of the sound hole.

Another example of bracing is provided by Ryan Guitars of Southern California (see www.ryanguitars.com). Among the design innovations disclosed on the website are bracing patterns. Another is engineered laser cut bracing, which ostensibly is strong and light and achieves an exquisitely responsive soundboard.

Thus, conventional guitars and similar instruments often include a series of structural supports on the underside of the top or soundboard of the instrument, commonly with two main supporting braces arrayed in an intersecting arrangement resembling the letter X. The X is oriented with the intersection of the braces centrally located on the underside of the face of the instrument, typically in front of the attachment point of the strings. These instruments will commonly use additional asymmetrical bracing in the area near and behind the attachment point of the strings to further stabilize the top of the instrument to prevent distortion from the tension imparted by the strings. This method is a compromise between the rigidity of the top of the instrument and its flexibility and ability to vibrate. Another method of support commonly used in guitars possessing low tension nylon or gut strings is to provide multiple supporting bars with their origin near the sound hole of the instrument, parallel to the strings, or spayed out into the wider portions of the body of the guitar.

Instruments with strings attached to the center of the vibrating diaphragm in the manner of conventional flat top guitars are inefficient amplifiers of string energy. Much of the inertia imparted by the musician into the vibrating string is dissipated and lost through the supporting members of an instrument, rather than being amplified by the body of the instrument. This lost energy reduces the potential tone and sustain in a stringed instrument.

The action of vibrating strings is governed largely by the structure to which the strings are anchored and tensioned across. The more rigid the structure is made, the more the structure is resistant to vibrating. A structure resistant to vibrating will absorb little of the energy of the strings, allowing the strings to continue vibrating for an extended length of time. This characteristic of a rigid supporting structure and corresponding longer sustaining string vibration is manifested in a long sustaining musical tone of the instrument; this quality is a benefit to the musician performing on such an instrument.

One disadvantage of a rigid supporting structure is that the imparted limitation on vibration directly impacts the ability of the structure to resonate and convert the vibration of the strings into audible volume. Volume is measured in amplitude of vibration. Great volume is necessary for a musical instrument to amplify the vibration of the strings. The more flexible the supporting structure of the instrument is, the higher the amplitude or potential volume of the produced musical tones. Another disadvantage is that a rigid structure tends to be excessively heavy and may compromise tone. A lighter guitar structure tends to sound better but has a greater risk of structural damage.

Accordingly, the tone and sustain of a guitar are fundamentally in conflict with one another and trade-offs are often required in design. An opposition exists between the rigidity needed for long sustaining vibration and the flexibility needed to produce audible volume in the form of vibrational amplitude. Some luthiers view balance of these two characteristics as preferable, and instruments are constructed conventionally in a manner which attempts to balance rigidity and flexibility to result in a musical instrument possessing both sustain and tone.

Therefore, one disadvantage associated with conventional musical instruments such as guitars is the requisite trade-off between rigidity and flexibility. Another disadvantage associated with conventional musical instruments is the conflict between achieving a preferential tone and achieving a preferential sustain. Yet another disadvantage associated with conventional musical instruments involves the relatively large mass of the material used to construct the instrument.

In view of the disadvantages outlined above, there exists a need for a musical instrument that does not require a trade-off between rigidity and flexibility. There also exists a need for a musical instrument that avoids the conflict between achieving a preferential tone and achieving a preferential sustain. Another need exists for a musical instrument that is able to retain structural integrity while allowing the structure to vibrate more freely. A related need is to translate this change in dynamics to an increase in amplitude. Another related need is to reduce the overall mass of a musical instrument to create an increase in the both the length and quality of sustain.

BRIEF SUMMARY OF THE DISCLOSURE

To meet these and other needs and to overcome the disadvantages of existing designs, a musical instrument having a body that includes a sonic channel, skeletonized bracing, or both a sonic channel and skeletonized bracing is provided. An object of the present disclosure is to achieve greater flexibility in strategic areas of the soundboard, the back, or both the soundboard and the back of the body. A related object is to produce a desired tonal effect for a musical instrument having a soundboard and a back. Another related object is to allow for tonal optimization based on the body shape of the musical instrument having the soundboard and the back. Yet another object is to target specific regions of the soundboard and the back to maximize the desired tonal effect. It is still another object of the present disclosure to allow for the selection of the width and position of the relieved areas on the soundboard and back of the body of a musical instrument.

To achieve these and other objects, and in view of its purposes, the present disclosure provides a musical instrument having a body defining a sound chamber for the musical instrument. The body has a soundboard, a back, and a lateral sidewall connecting the soundboard and the back. The soundboard includes multiple braces with at least one brace skeletonized, and a first sonic channel having a plurality of substantially polygonal-shaped sections and bounding the at least one skeletonized brace. The back includes multiple back braces with at least one back brace skeletonized, and a second sonic channel having a plurality of substantially polygonal-shaped sections and bounding the at least one skeletonized back brace. The musical instrument may be a guitar.

It is to be understood that both the foregoing general description and the following detailed description are exemplary, but are not restrictive, of the invention.

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE TECHNOLOGY

Figure 1:
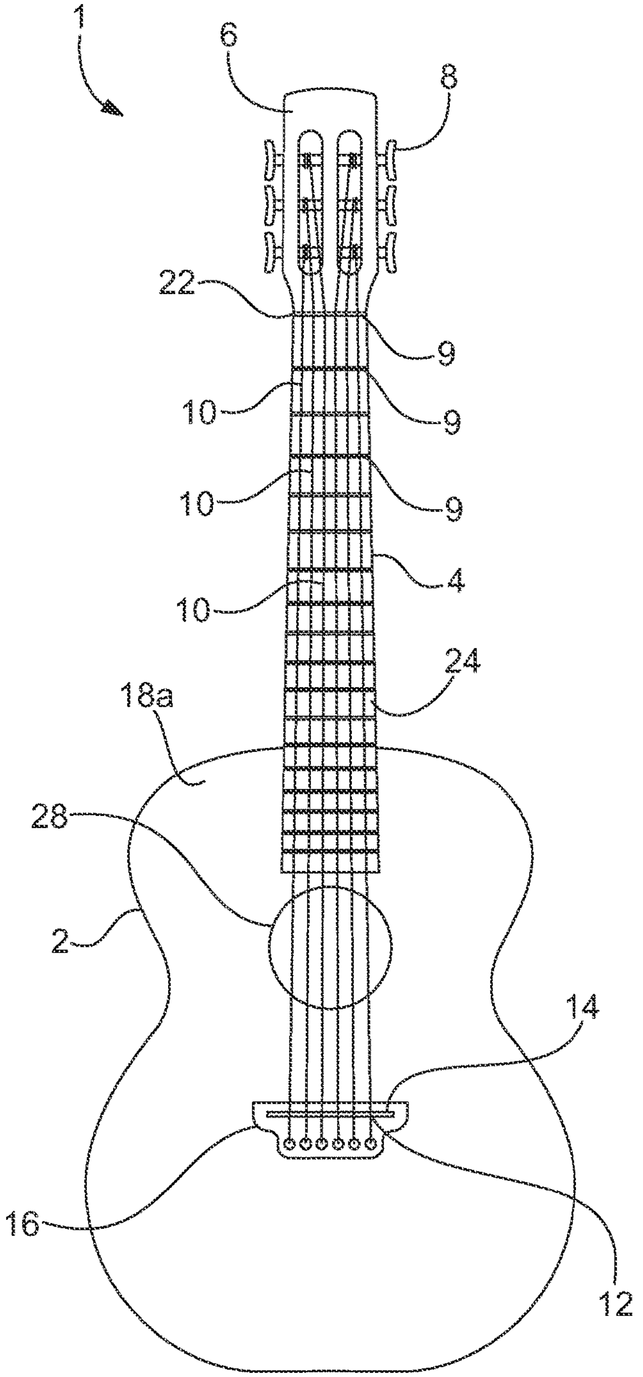
FIG. 1 is a diagrammatic perspective view of a conventional guitar.

In this specification and in the claims that follow, reference will be made to a number of terms which shall be defined to have the following meanings ascribed to them. "Include," "includes," "including," "have," "has," "having," comprise," "comprises," "comprising," or like terms mean encompassing but not limited to, that is, inclusive and not exclusive. The indefinite article "a" or "an" and its corresponding definite article "the" as used in this disclosure means at least one, or one or more, unless specified otherwise. Directional terms as used in this disclosure—for example up, down, right, left, front, back, top, bottom—are made only with reference to the figures as drawn and the coordinate axis provided with those figures and are not intended to imply absolute orientation.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for components, and ranges thereof, are for illustration only; they do not exclude other defined values or other values within defined ranges. The components and methods of the disclosure include those having any value or any combination of the values, specific values, more specific values, and preferred values described.

"Contact" refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. "Contacting" refers to placing two elements in direct or indirect contact. Elements in direct (indirect) contact may be said to directly (indirectly) contact each other.

A. Introduction

The stringed musical instruments in accordance with the present invention may include guitars, such as acoustic guitars, solid body electric guitars, and acoustic electric guitars, but may also include other stringed musical instruments such as, for example, banjos, mandolins, violins, lutes, and/or other similar instruments. Although the principles of the present disclosure are described in connection with guitars, it should be understood that the principles disclosed are also applicable to other stringed musical instruments which have an instrument body and an elongated neck along which the strings are stretched.

Figure 2:
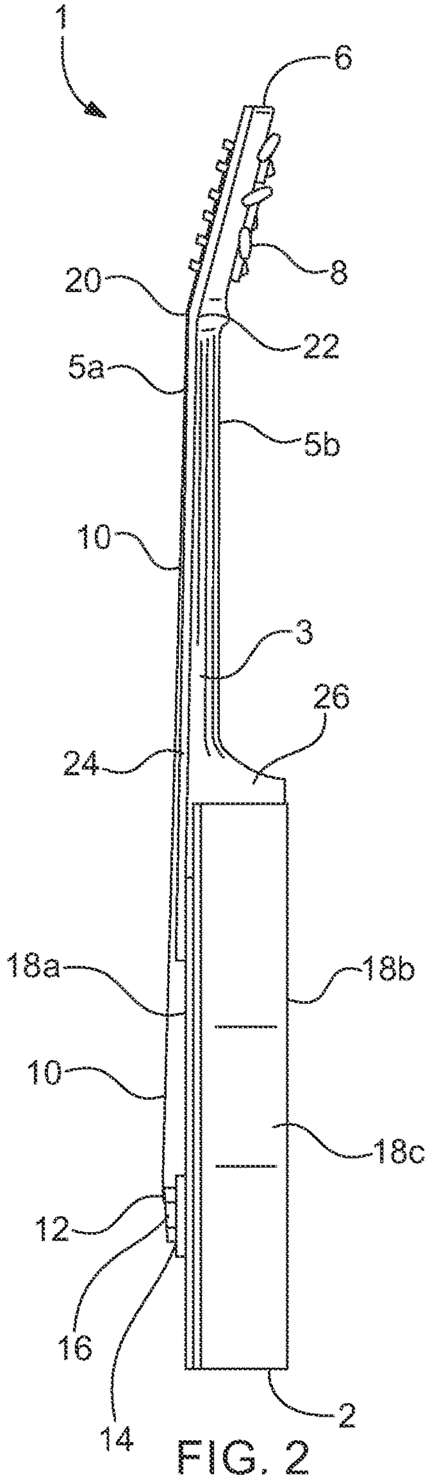
FIG. 2 is a diagrammatic side view of the guitar illustrated in FIG. 1.

Refer now to the drawing, in which like reference numbers designate like elements throughout the various figures that comprise the drawing. Turning first to FIGS. 1 and 2, a brief description concerning the various components of the stringed instrument, according to both the prior art and the present invention, will now be briefly discussed. As shown in these figures, the guitar 1 has a guitar body 2 connected to a neck 4 in a conventional manner. The body 2 is comprised of a front plate 18*a* having a circular sound hole 28, a rear plate 18*b* facing the front plate 18*a*, and a lateral plate 18*c* combined with edges of the front plate 18*a* and the rear plate 18*b* in a way to be spaced apart from each other. Sound resonance is generated in the internal space formed by the front plate 18*a*, the rear plate 18*b*, and the lateral plate 18*c*. Further, formed in one side of the body 2 is an aperture into which the neck 4 is inserted.

The neck 4 takes the form of a beam 3 having a considerable thickness with a top surface 5*a* and a bottom surface 5*b*. The neck 4 typically comprises a wood or some other similar or conventional material, which is suitable to withstand continual string pull without warping or twisting. The neck 4 has an integral headstock 6 which holds a number of separate tuning pegs 8 (typically six or possibly twelve tuning pegs) which each, in turn, respectively retain a free end of a desired string 10 in a conventional manner. The strings 10 are typically made of nylon or steel. The strings 10 are strung at substantial tension (e.g., about 30 pounds of tension per string) and extend from a first fixed point or axis 12, formed by a saddle 14 supported by a bridge 16 which is permanently affixed to the front plate 18*a* of the guitar body 2, to a second fixed axis 20, formed by a nut 22 which is permanently affixed to the top surface 5*a* of the neck 4, located adjacent the headstock 6. Further, installed inside the beam 3 of the neck 4 is an adjustment or truss rod (not shown) for preventing the neck 4 from bending or being distorted by the tension force of the guitar strings 10.

A fingerboard (also known as a fretboard 24 on fretted instruments) is an important component of most stringed instruments. The fretboard 24 is a thin, long strip of hard material, usually a re-enforced polymer or wood such as rosewood or ebony, that mates with and is formed on the top surface 5*a* of the neck 4 so as to be located between and space a remainder of the neck 4 from the strings 10. The material from which the fretboard 24 is manufactured should be strong, durable, and stable enough to support and retain the metal frets 9, which are installed on top of the fretboard 24 at regular intervals, and withstand playing wear through years of use. The strings 10 run over the fretboard 24 between the nut 22 and the bridge 16. For conventional guitars, a heel 26 is formed integrally with a remainder of the neck 4 and extends from the bottom surface 5*b* of the neck 4. By "integral" is meant a single piece or a single unitary part that is complete by itself without additional pieces, i.e., the part is of one monolithic piece formed as a unit with another part.

As shown in FIG. 1, the upper bout 30 is the part of the guitar body 2 that is nearest the neck 4; the upper bout 30 extends approximately from the top of the body 2 to the middle of the sound hole 28. The lower bout 32 is the largest part of the guitar body 2 that is nearest to the string termination at the bridge 16; the lower bout 32 extends approximately from the middle of the sound hole 28 to the bottom of the body 2.

When using the guitar 1, the musician moves his or her fingers up and down the neck 4, pressing the strings 10 so as to shorten them and create various pitches as the strings 10 are strummed, plucked, or otherwise excited. Typically, the frets 9 on the fretboard 24 extend across the width of the neck 4 so as to provide a place to anchor the ends of the shortened strings 10 at definite or desired locations.

Normally, the strings 10 are tuned to pitch at the top of the neck 4 or headstock 6 where the tuning pegs 8 increase or decrease the tension on each string 10. The user then renders the desired notes by strumming the strings 10 near the middle of the guitar body 2 while pressing the strings 10 which extend over the neck 4 onto the fretboard 24 attached to the top surface 5*a* of the neck 4. The tone of the note produced depends on the tension of the string 10 and the distance between the fret 9 at which the string 10 is depressed onto the neck 4 and the lower anchor point. The smaller the distance between the depressed string 10 and the bridge 16, the higher pitch the resulting tone will be. Increasing the tension of the strings 10 will also produce a note with a higher pitch.

In the case of an acoustic instrument, such as an acoustic guitar 1, the body 2 encloses a resonant sound chamber. Strumming, plucking, or otherwise exciting the strings 10 causes the strings 10 to vibrate. This vibration in turn causes the bridge 16 over which the strings 10 extend to vibrate. In fact, the bridge 16 forms the vibrating end point of the strings 10 for every note that is played. Vibration of the bridge 16 in turn causes the front plate 18*a* of the acoustic instrument, known as the soundboard, to vibrate as well, which in turn causes air entrapped in the sound chamber to move to generate the sound heard through the sound hole 28 upon play of the instrument. The vibration of the soundboard 18*a* greatly influences the tone of the guitar 1. As a general rule, the more freely the soundboard 18*a* can vibrate, the louder and better the tone of the guitar 1.

The guitar 1 shown in FIGS. 1 and 2 illustrates just one example of a shape suitable for the body 2. In the example shown, the body 2 is dreadnought-shaped, which is a shape generally attributed to C. F. Martin & Co., Inc. The principles disclosed in this document are also applicable to other body shapes, of course, such as the cutaway shape illustrated in FIGS. 7 and 8. Cutaway guitars 1 are designed with a curve in the upper part of the body 2, right below the neck 4, and tend to make the upper frets 9 easier to access. C. F. Martin & Co., Inc. markets several guitars 1 having cutaway body shapes, including models marketed under the designation "GPC" (Grand Performance Cutaway).

B. Instrument Soundboard

Figure 3:
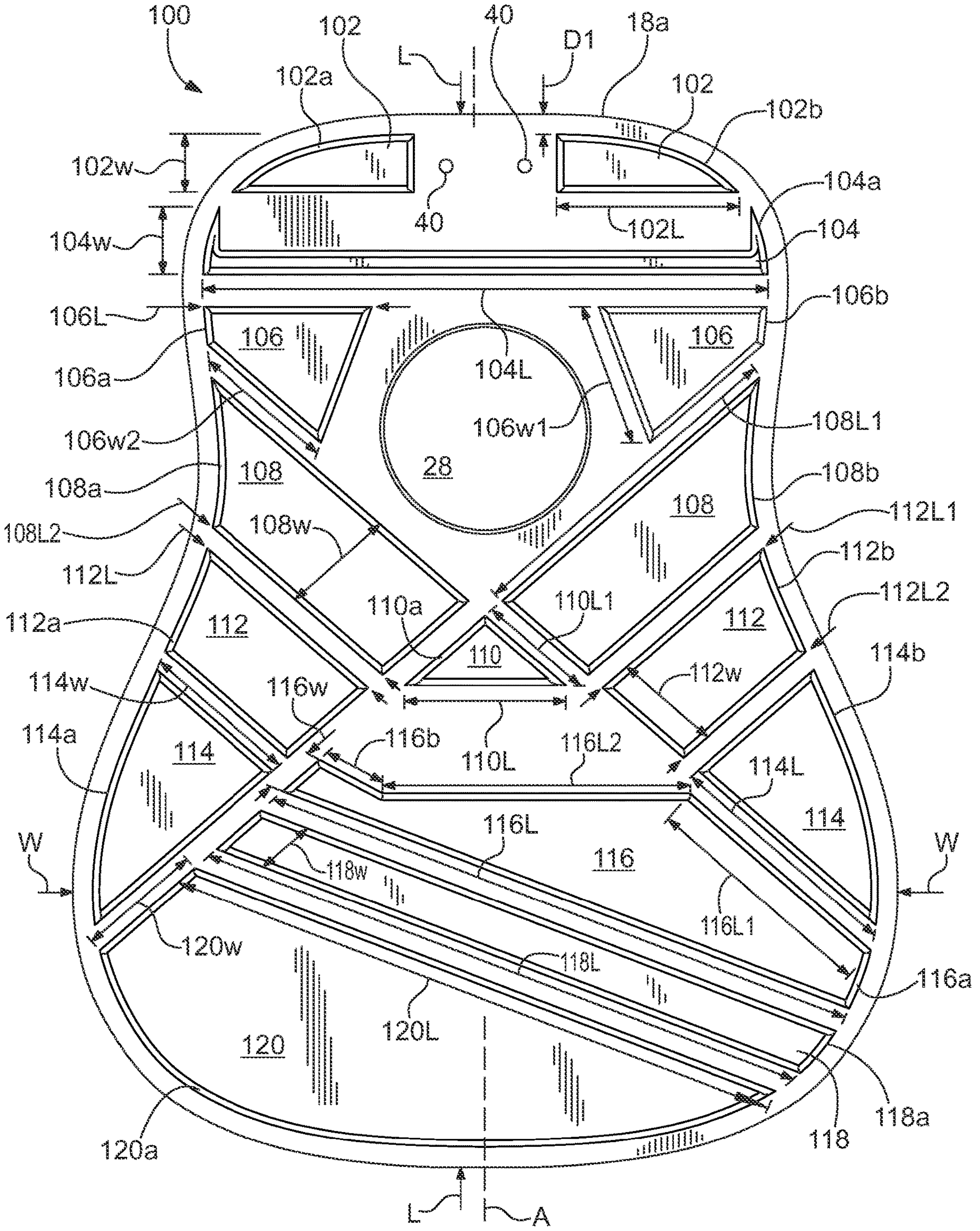
FIG. 3 is a plan view of the underside of a guitar top (soundboard) illustrating one embodiment of a sonic channel.

Returning to the structure of the guitar 1, highlighted in FIG. 3 is the underside of the front plate (guitar top or soundboard) 18*a* illustrating one embodiment of a sonic channel 100 formed in the soundboard 18*a*. The underside is the bottom or inside surface of the soundboard 18*a*, which is the surface of the soundboard 18*a* that helps to define the sound chamber. The sonic channel 100 is formed in the soundboard 18*a* using any conventional manufacturing process. Mechanical cutting, laser cutting, and abrasive removal using an abrasive wheel are three example manufacturing processes, as would be known to an artisan. Routing is a preferred process to form the sonic channel 100 in the soundboard 18*a*.

Routing is a high-speed process of cutting, trimming, and shaping materials such as wood and plastic. The set up needed to rout the sonic channel 100 in the soundboard 18*a* includes an air or electric driven router, a cutting tool often referred to as a router bit able to cut a round nose profile in the wood, and a guide template. The router is a power tool with a flat base and a rotating blade extending past the base. The spindle may be driven by an electric motor or by a pneumatic motor. The tool routs (hollows out) an area (such as the sonic channel) in hard material, such as wood or plastic. Routers are used most often in woodworking to create such items as cabinets and guitars. They may be handheld or affixed to router tables. Some woodworkers consider the router to be one of the most versatile power tools.

A computer numerically controlled (CNC) wood router is a computer controlled machine to which the router or spindle mounts. The CNC router can be either a moving gantry style, where the table is fixed and the router spindle moves over it, or fixed bridge design, where the table moves underneath the router spindle, or hand-held style, where the operator moves the machine to the area to be cut and the machine controls the fine adjustments. CAD/CAM software programming is used to model the part that is to be created in the computer and then create a tool path for the machine to follow to cut out the part. The CNC router moves along three axes (X-Y-Z). Most CNC routers have a three motor drive system utilizing either servo or stepper motors. More advanced routers use a four motor system for added speed and accuracy.

In one example embodiment, as illustrated in FIG. 3, the maximum width W of the body 2 (which occurs in the lower bout 32) and, therefore, of the soundboard 18*a* is about 16 inches (40 cm) and the length L of the body 2 is about 20.5 inches (52 cm). Also illustrated in FIG. 3 are the sound hole 28 (which is circular with an outer diameter of about 4 inches or 10.16 cm) and two clearance holes 40 (although one, three, or more clearance holes 40 are possible). The clearance holes 40 are located proximate to the neck end of the body 2 and are configured to receive fasteners (such as bolts) used to affix the neck 4 to the body 2 of the guitar 1. In the example embodiment shown in FIG. 3, the sonic channel 100 of the soundboard 18*a* is about 0.125±0.003 inches (0.3175±0.0076 cm) wide and about 0.030±0.003 inches (0.076±0.0076 cm) deep. The sonic channel 100 includes fifteen, separate, discrete sections, as illustrated, with each section defining an area or footprint on the soundboard 18*a*.

The first section 102*a* of the sonic channel 100 defines a substantially right triangle-shaped first area 102. A right triangle is a triangle one of whose angles is a right angle, and the side opposite the right angle is called the hypotenuse. In the example shown, the hypotenuse is located proximate the outer perimeter of the soundboard 18*a* and is substantially curved to follow the contour of that outer perimeter. The term "substantially," as used in this document, is a descriptive term that denotes approximation and means "considerable in extent" or "largely but not wholly that which is specified" and is intended to avoid a strict boundary to the specified parameter. The first section 102*a* is located proximate both to the neck end of the soundboard 18*a* and to one of the clearance holes 40, with its width 102W approximately centered on the clearance hole 40.

The second section 102*b* of the sonic channel 100 is the mirror image of the first section 102*a* of the sonic channel 100. The first section 102*a* and the second section 102*b* are symmetrically located on opposite sides of the longitudinal axis A of the soundboard 18*a*. Like the first section 102*a*, the second section 102*b* defines a substantially right triangle-shaped first area 102. In the example illustrated, the first section 102*a* and the second section 102*b* each have a width 102W of about 1.105 inches (2.807 cm) and a length 102L of about 3.4502 inches (8.7635 cm). The distance D1 from the top of each of the first section 102*a* and the second section 102*b* to the heel end of the body 2 is about 0.3852 inches (0.9784 cm).

The third section 104*a* of the sonic channel 100 defines a substantially rectangular-shaped and horizontally disposed third area 104 having pointed end projections at the opposite ends of the third section 104*a*. In the example illustrated, the third section 104*a* has a maximum width 104W at the pointed end projections of about 1.2794 inches (3.2496 cm) and a length 104L of about 10.7317 inches (27.2585 cm). The third section 104*a* is located below the first section 102*a* and the second section 102*b* and above the sound hole 28.

The fourth section 106*a* of the sonic channel 100 defines a substantially triangular-shaped fourth area 106. The fourth section 106*a* is located under the third section 104*a* and along one side of the sound hole 28. In the example illustrated, the fourth section 106*a* has a length 106L, which defines the extent of the first of the three legs of the fourth section 106*a*, of about 3.1948 inches (8.114 cm). A second leg of the fourth section 106*a* is substantially straight and extends a linear distance 106W1 of about 2.7662 inches (7.0261 cm). A third leg of the fourth section 106*a* has a substantially straight portion that extends a linear distance 106W2 of about 2.8622 inches (7.2699 cm) and a bend that connects the substantially straight portion to the first leg. The bend is located proximate the outer perimeter of the soundboard 18*a*.

The fifth section 106*b* of the sonic channel 100 is the mirror image of the fourth section 106*a* of the sonic channel 100. The fourth section 106*a* and the fifth section 106*b* are symmetrically located on opposite sides of the longitudinal axis A of the soundboard 18*a*. Like the fourth section 106*a*, the fifth section 106*b* defines a substantially triangular-shaped fourth area 106.

The sixth section 108*a* of the sonic channel 100 defines a substantially trapezoid-shaped sixth area 108. The sixth section 108*a* is angled at about 45 degrees so that the sixth section 108*a* extends partially along and under both the fourth section 106*a* and the sound hole 28. In the example illustrated, the sixth section 108*a* has a length 108L, which defines the extent of the longer of the two substantially straight and parallel legs of the sixth section 108*a*, of about 6.4716 inches (16.4378 cm). The length 108L2 of the shorter of the two substantially straight and parallel legs of the sixth section 108*a* is about 4.2839 inches (10.8811 cm). The sixth section 108*a* has a width 108W, which defines the extent of the substantially straight, non-parallel leg of the sixth section 108*a*, of about 2.1578 inches (5.4808 cm). The other non-parallel leg of the sixth section 108*a* is located proximate the outer perimeter of the soundboard 18*a* and is substantially curved to follow the contour of that outer perimeter.

The seventh section 108*b* of the sonic channel 100 is the mirror image of the sixth section 108*a* of the sonic channel 100. The sixth section 108*a* and the seventh section 108*b* are symmetrically located on opposite sides of the longitudinal axis A of the soundboard 18*a*. Like the sixth section 108*a*, the seventh section 108*b* defines a substantially trapezoid-shaped sixth area 108.

The eighth section 110*a* of the sonic channel 100 defines a substantially isosceles triangle-shaped eighth area 110. An isosceles triangle is a triangle with two equal sides, with the third side called a base and the angle opposite the base called the vertex. In the example illustrated, the eighth section 110*a* has a length 110L, which defines the extent of the base, of about 3.0642 inches (7.7830 cm). Each of the two equal sides of the eighth section 110*a* has a length 110L1 of about 2.0299 inches (5.1559 cm). The eighth section 110*a* is located proximate both the sixth section 108*a* and the seventh section 108*b* and is centered both under the sound hole 28 and on the longitudinal axis A.

The ninth section 112*a* of the sonic channel 100 defines a substantially trapezoid-shaped ninth area 112. The ninth section 112*a* is angled at about 45 degrees so that the ninth section 112*a* extends partially along and under the sixth section 108*a*. In the example illustrated, the ninth section 112*a* has a length 112L, which defines the extent of the longer of the two substantially straight and parallel legs of the ninth section 112*a*, of about 4.0516 inches (10.2910 cm). The length 112L2 of the shorter of the two substantially straight and parallel legs of the ninth section 112*a* is about 3.0833 inches (7.8315 cm). The ninth section 112*a* has a width 112W, which defines the extent of the substantially straight, non-parallel leg of the ninth section 112*a*, of about 2.0317 inches (5.1605 cm). The other non-parallel leg of the ninth section 112*a* is located proximate the outer perimeter of the soundboard 18*a* and is substantially curved to follow the contour of that outer perimeter.

The tenth section 112*b* of the sonic channel 100 is the mirror image of the ninth section 112*a* of the sonic channel 100. The ninth section 112*a* and the tenth section 112*b* are symmetrically located on opposite sides of the longitudinal axis A of the soundboard 18*a*. Like the ninth section 112*a*, the tenth section 112*b* defines a substantially trapezoid-shaped ninth area 112.

The eleventh section 114*a* of the sonic channel 100 defines a substantially right triangle-shaped eleventh area 114. The eleventh section 114*a* is angled at about 45 degrees so that the eleventh section 114*a* extends partially along and under the ninth section 112*a*. In the example shown, the hypotenuse of the eleventh section 114*a* is located proximate the outer perimeter of the soundboard 18*a* and is substantially curved to follow the contour of that outer perimeter.

The twelfth section 114*b* of the sonic channel 100 is the mirror image of the eleventh section 114*a* of the sonic channel 100. The eleventh section 114*a* and the twelfth section 114*b* are symmetrically located on opposite sides of the longitudinal axis A of the soundboard 18*a*. Like the eleventh section 114*a*, the twelfth section 114*b* defines a substantially right triangle-shaped eleventh area 114. In the example illustrated, the eleventh section 114*a* and the twelfth section 114*b* each have a width 114W of about 2.9176 inches (7.4167 cm) and a length 114L of about 4.4763 inches (11.3698 cm).

The thirteenth section 116*a* of the sonic channel 100 defines a thirteenth area 116 that is shaped substantially like a home plate in the game of baseball, namely, a pentagon, which is a five-sided figure that is like a triangle on top of a rectangle. The thirteenth section 116*a* is angled at about 45 degrees and extends directly under the eighth section 110*a*. In the example illustrated, the thirteenth section 116*a* has a length 116L, which defines the extent of the first side that forms the base of the thirteenth section 116*a*, of about 11.5190 inches (29.2582 cm). The thirteenth section 116*a* has a length 116L1, which defines the substantially straight shorter second side of the thirteenth section 116*a* that forms part of the triangle, of about 4.5563 inches (11.5730 cm). The longer third side of the thirteenth section 116*a* that also forms part of the triangle has a substantially straight portion extending a linear distance 116L2 of about 5.8361 inches (14.8236 cm) and a bend that connects the substantially straight portion to the substantially straight fourth side that forms part of the rectangle. The bend is substantially straight, is located proximate both the ninth section 112*a* and the eleventh section 114*a*, and extends a distance 116B of about 1.3627 inches (3.4612 cm). The substantially straight fourth side that forms part of the rectangle defines the width 116W of the thirteenth section 116*a* and extends about 0.9199 inches (2.3365 cm). The fifth side of the thirteenth section 116*a*, which also forms part of the rectangle, is located proximate the outer perimeter of the soundboard 18*a* and is substantially curved to follow the contour of that outer perimeter.

The fourteenth section 118*a* of the sonic channel 100 defines a substantially trapezoid-shaped fourteenth area 118. The fourteenth section 118*a* is angled at about 45 degrees so that the fourteenth section 118*a* extends partially along and under both the eleventh section 114*a* and the thirteenth section 116*a*. In the example illustrated, the fourteenth section 118*a* has a length 118L, which defines the extent of one of the two substantially straight and parallel legs of the fourteenth section 118*a*, of about 11.7025 inches (29.7293 cm). The fourteenth section 118*a* has a width 118W, which defines the extent of the substantially straight, non-parallel leg of the fourteenth section 118*a*, of about 1.1138 inches (2.8341 cm). The other non-parallel leg of the fourteenth section 118*a* is located proximate the outer perimeter of the soundboard 18*a* and is substantially curved to follow the contour of that outer perimeter.

The fifteenth section 120*a* of the sonic channel 100 defines a substantially obtuse triangle-shaped fifteenth area 120. An obtuse triangle is a triangle that contains an obtuse interior angle, namely an angle between 90 and 180 degrees. In the example illustrated, the fifteenth section 120*a* has a length 120L, which defines the extent of the longer of the two substantially straight legs, of about 11.8228 inches (30.0299 cm). The fifteenth section 120*a* has a width 120W, which defines the extent of the shorter of the two substantially straight legs, of about 2.3886 inches (6.0670 cm). The third leg of the fifteenth section 120*a* is located proximate the outer perimeter of the soundboard 18*a* and is substantially curved to follow the contour of that outer perimeter. The fifteenth section 120*a* is located proximate the heel end of the soundboard 18*a* and below both the eleventh section 114*a* and the fourteenth section 118*a*.

The guitar body 2 is typically made of wood. Preferably, the body 2 of the guitar 1 is made from a domestic (deciduous trees growing in the United States only) hardwood, such as maple, walnut, or Sitka spruce. The use of domestic hardwood to improve the sound of stringed musical instruments supports the wood sustainability efforts of instrument manufacturers. According to other embodiments, however, the guitar body 2 may be made of another type of wood such as mahogany or rosewood or of plastic, graphite, or other appropriate materials. The sonic channel 100 is applicable to wood materials as well as alternative materials including, but not limited to plastic, graphite, composite, carbon fiber, and laminate, and could be formed directly into such materials without necessitating any type of cut.

The precise geometry of the sonic channel 100 can be adjusted, in combination with (among other structural characteristics of the guitar 1) the bracing that is also located on the bottom of the soundboard 18*a*, to achieve desired tonal qualities. Guitar bracing refers to the system of struts (typically wooden) that internally support and reinforce the soundboard 18*a* and rear plate or back 18*b* of acoustic guitars. Bracing of the soundboard 18*a* (or top bracing) transmits the forces exerted by the strings 10 from the bridge 16 to the rim or lateral plate 18*c*. The luthier faces the challenge of bracing the guitar 1 to withstand the stress applied by the strings 10 with minimal distortion, while permitting the soundboard 18*a* to respond as fully as possible to the tones generated by the strings 10. Brace design contributes significantly to the type of sound the guitar 1 will produce. Braces may be made from top woods (spruce or cedar), balsa wood or, in certain instruments, carbon fiber composites.

Figure 4:
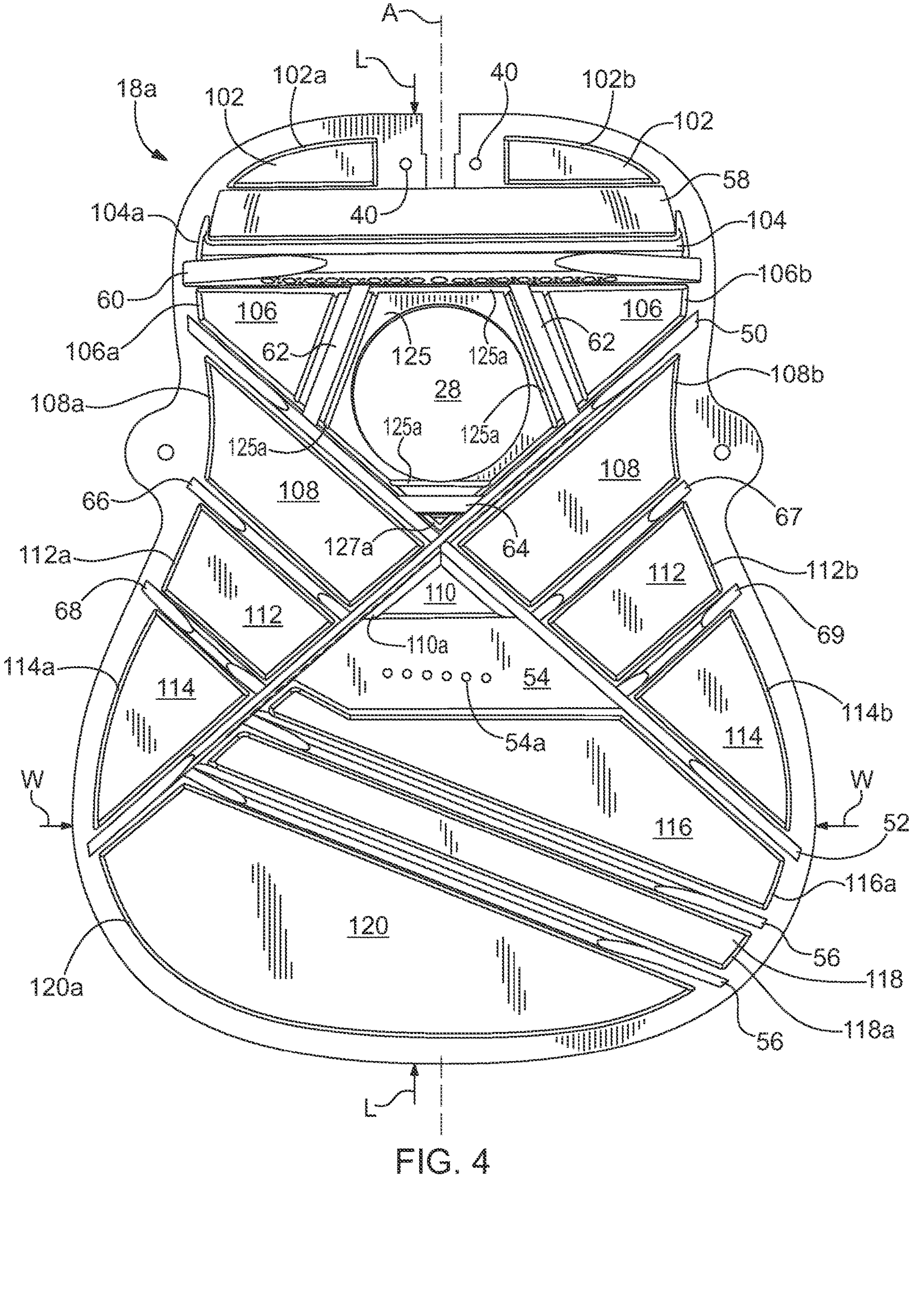
FIG. 4 is a plan view of the underside of the guitar top shown in FIG. 3 to which has been added one embodiment of skeletonized and other braces.

FIG. 4 is a plan view of the underside of the guitar top or soundboard 18*a* shown in FIG. 3, depicting the fifteen sections of the sonic channel 100, to which have been added one embodiment of skeletonized and other braces. In the example shown, the soundboard 18*a* is braced using an X-brace system or a variation of the X-brace system. The system consists of two braces 50, 52 forming an "X" shape across the soundboard 18*a* below the top of the sound hole 28. More details about the construction of the X-braces 50, 52 are provided below in the context of FIG. 4B.

Preferably, the X-braces 50, 52 are morticed or notched at the point where the X-braces 50, 52 cross so that they fit over or seat into one another. Brace 50 is notched from the bottom surface of the brace 50, for example, and brace 52 is notched from the top of the brace 52. Alternatively, at least one of the X-braces 50, 52 could be made in two pieces so that the two pieces abut opposite sides of the other X-brace at the point where the X-braces 50, 52 cross. The X-braces 50, 52 are typically notched as opposed to being made into two pieces to provide more cross-directional rigidity in the general bridge area (specifically, for example, in front of the bridge 16). The lower arms of the "X" straddle and support the ends of the bridge 16. In the example illustrated, the X-braces 50, 52 join near the center of the soundboard 18*a* at a point along the longitudinal axis A and just below the sound hole 28. The X-braces 50, 52 terminate at four ends that are located proximate the periphery of the soundboard 18*a*.

The tension applied by the strings 10 to the soundboard 18*a* can distort the guitar 1, rendering it unusable. The X-braces 50, 52 attached to the soundboard 18*a* resist deformation by increasing the rigidity of the soundboard 18*a* along the longitudinal axis A. The X-braces 50, 52 may be fashioned in one of multiple ways that would alter either the rigidity of the X-braces 50, 52 or the ability of the X-braces 50, 52 to assist in the resistance of the soundboard 18*a* to deformation. The X-braces 50, 52 may be composed of a single material or a composite of two or more materials, such that the mechanical properties can be tailored to a specific embodiment of the soundboard 18*a*. Wood is a preferred material. A thickness of the X-braces 50, 52 may be altered in order to vary the brace rigidity. The precise arrangement of the X-braces 50, 52 on the soundboard 18*a* may be altered, by increasing or decreasing the angle between the longitudinal axis A and each X-brace 50, 52, in order to increase or decrease the support provided by the X-braces 50, 52 along the longitudinal axis A. The ability to make such modifications allows for precise control of the rigidity of the soundboard 18*a*.

As illustrated, the X-brace 50 is bounded on one side by various sections of the sonic channel 100: the fifth section 106*b*, the sixth section 108*a*, the ninth section 112*a*, and the eleventh section 114*a*. (By "bounded" is meant that the various sections of the sonic channel 100 form the boundary or limit of, or demarcate, the X-brace 50.) The X-brace 50 is bounded on its opposite side by the seventh section 108*b*, the eighth section 110*a*, the thirteenth section 116*a*, the fourteenth section 118*a*, and the fifteenth section 120*a*. The X-brace 52 is bounded on one side by the fourth section 106*a*, the seventh section 108*b*, the tenth section 112*b*, and the twelfth section 114*b*. The X-brace 52 is bounded on its opposite side by the sixth section 108*a*, the eighth section 110*a*, and the thirteenth section 116*a*.

Located under the bridge 16 is a bridge plate 54 which reinforces the bridge 16, helps support the soundboard 18*a*, anchors the ball ends of the strings 10, and prevents the ball ends of the strings 10 from damaging the underside of the soundboard 18*a*. The bridge plate 54 is a flat piece of wood (typically hardwood) that is affixed to the bottom surface of the soundboard 18*a* and sits inside the body 2 of the guitar 1 underneath the bridge 16. The bridge plate 54 is disposed horizontally on the soundboard 18*a* and abuts each of the X-braces 50, 52. As illustrated, the bridge plate 54 is bounded on one side by the eighth section 110*a* of the sonic channel 100 and on its opposite side by the thirteenth section 116*a* of the sonic channel 100.

The bridge plate 54 has a plurality of openings 54*a* corresponding in number to the number of strings 10 carried by the guitar 1. Six openings 54*a* are illustrated, as an example, one opening 54*a* for each of six strings 10. One string 10 passes through one corresponding opening 54*a*, ending in a ball end that prevents the string 10 from being pulled out of the opening 54*a*.

Below the bridge plate 54 are one or more tone bars 56 which support the bottom of the soundboard 18*a*. The tone bars 56 are typically solid pieces of wood, without any holes or openings that might weaken them. The tone bars 56 abut one of the X braces, for example the X-brace 50, and usually slant at an angle of about 45 degrees downward towards the bottom edge of the soundboard 18*a*. Any suitable number of tone bars 56 can be affixed to the soundboard 18*a* depending upon the application. Therefore, although two tone bars 56 are illustrated in FIG. 4, three or more tone bars 56 could be affixed to the soundboard 18*a*. As illustrated, the upper tone bar 56 is bounded on one side by the thirteenth section 116*a* of the sonic channel 100 and on its opposite side by the fourteenth section 118*a* of the sonic channel 100. The lower tone bar 56 is bounded on one side by the fourteenth section 118*a* of the sonic channel 100 and on its opposite side by the of the fifteenth section 120*a* of the sonic channel 100.

Located under the fingerboard or fretboard 24 is a fretboard plate 58 which reinforces the fretboard 24 and helps support the soundboard 18*a*. The fretboard plate 58 is a substantially trapezoid-shaped, flat piece of wood (typically hardwood) that is affixed to the bottom surface of the soundboard 18*a* and sits inside the body 2 of the guitar 1 underneath the fretboard 24. The fretboard plate 58 is disposed horizontally on the soundboard 18*a* in the upper bout 30. As illustrated, the fretboard plate 58 is bounded on one side by the first section 102*a* and the second section 102*b* of the sonic channel 100 and on its opposite side by the third section 104*a* of the sonic channel 100.

Also disposed horizontally on the soundboard 18*a* in the upper bout 30 is a top brace 60. The top brace 60 extends horizontally from one peripheral edge of the soundboard 18*a* and across the soundboard 18*a* to the opposite peripheral edge of the soundboard 18*a*. The top brace 60 is located above the sound hole 28 and supports the fingerboard 18*a* especially in the region of the sound hole 28. As illustrated, the top brace 60 is bounded on one side by the third section 104*a* of the sonic channel 100 and on its opposite side by fourth section 106*a* and the fifth section 106*b* of the sonic channel 100. More details about the construction of the top brace 60 are provided below in the context of FIGS. 4A and 4C.

On either side of the sound hole 28 and proximate the edge of the sound hole 28 are angled braces 62 that vertically span the horizontal transition between the upper bout 30 and the lower bout 32 of the soundboard 18*a*. The two angled braces 62 are flat pieces of wood (typically hardwood) that are affixed to and support the bottom surface of the soundboard 18*a* in the vicinity of the sound hole 28. The left angled brace 62 abuts the top brace 60 on one end and the X-brace 52 on its opposite end; the right angled brace 62 abuts the top brace 60 on one end and the X-brace 50 on its opposite end. As illustrated, the left angled brace 62 is bounded on one side by the fourth section 106*a* of the sonic channel 100 and the right angled brace 62 is bounded on one side by the fifth section 106*b* of the sonic channel 100.

Optionally, the sonic channel 100 may have a sixteenth section: a sound hole section 125*a* which defines a sound hole area 125 that surrounds the sound hole 28. If present, the sound hole section 125*a* bounds the sides of the angled braces 62 that otherwise would not be bounded by a section of the sonic channel 100. The sound hole section 125*a* also may bound a central portion of the top brace 60 on one side of the top brace 60.

Underneath the sound hole 28 and proximate the edge of the sound hole 28 is a horizontal brace 64 that extends between, and abuts, both the X-brace 50 and the X-brace 52. The horizontal brace 64 is a flat piece of wood (typically hardwood) that is affixed to and supports the bottom surface of the soundboard 18*a* in the vicinity of the sound hole 28. The sound hole section 125*a* of the sonic channel 100 may bound the horizontal brace 64 on one side of the horizontal brace 64. If desired, the sonic channel 100 may have a seventeenth section: a horizontal brace section 127*a*. If present, the horizontal brace section 127*a* bounds the opposite side of the horizontal brace 64.

Around the lower bout 32, one or more finger or fan braces support the area between the X-braces 50, 52 and the periphery or edge of the soundboard 18*a*. The width and the thickness of the fan braces could be any suitable dimension known in the art. The fan braces could be constructed from wood, plastic, or other material or composite with desired mechanical properties to allow for an additional level of control over the flexibility of the soundboard 18*a*.

Any suitable number of fan braces can be affixed to the soundboard 18*a* depending upon the application. Therefore, although four fan braces 66, 67, 68 and 69 are illustrated in FIG. 4, fewer or more fan braces could be affixed to the soundboard 18*a*. As illustrated, four fan braces 66, 67, 68 and 69 are disposed in pairs symmetrically on opposite sides of the longitudinal axis A: fan braces 66 and 68 are on the left of the longitudinal axis A and fan braces 67 and 69 are on the right of the longitudinal axis A. Optionally, fan braces 66, 67, 68 and 69 may be unpaired.

The fan brace 66 abuts the X-brace 50 on one end and extends at an angle of about 45 degrees until the fan brace 66 terminates proximate the periphery of the soundboard 18*a*. The fan brace 66 may abut the X-brace 50 at a perpendicular angle or at a non-perpendicular angle and the angle at which the fan brace 66 abuts the X-brace 50 may vary. As illustrated, the fan brace 66 is bounded on one side by the sixth section 108*a* of the sonic channel 100 and on the other side by the ninth section 112*a* of the sonic channel 100.

The fan brace 68 is shorter in length than and located below the fan brace 66. Like the fan brace 66, however, the fan brace 68 abuts the X-brace 50 on one end and extends at an angle of about 45 degrees until the fan brace 68 terminates proximate the periphery of the soundboard 18*a*. The fan brace 68 may abut the X-brace 50 at a perpendicular angle or at a non-perpendicular angle and the angle at which the fan brace 68 abuts the X-brace 50 may vary. As illustrated, the fan brace 68 is bounded on one side by the ninth section 112*a* of the sonic channel 100 and on the other side by the eleventh section 114*a* of the sonic channel 100.

The fan brace 67 abuts the X-brace 52 on one end and extends at an angle of about 45 degrees until the fan brace 67 terminates proximate the periphery of the soundboard 18*a*. The fan brace 67 may abut the X-brace 52 at a perpendicular angle or at a non-perpendicular angle and the angle at which the fan brace 67 abuts the X-brace 52 may vary. As illustrated, the fan brace 67 is bounded on one side by the seventh section 108*b* of the sonic channel 100 and on the other side by the tenth section 112*b* of the sonic channel 100.

The fan brace 69 is shorter in length than and located below the fan brace 67. Like the fan brace 67, however, the fan brace 69 abuts the X-brace 52 on one end and extends at an angle of about 45 degrees until the fan brace 69 terminates proximate the periphery of the soundboard 18*a*. The fan brace 69 may abut the X-brace 52 at a perpendicular angle or at a non-perpendicular angle and the angle at which the fan brace 69 abuts the X-brace 52 may vary. As illustrated, the fan brace 69 is bounded on one side by the tenth section 112*b* of the sonic channel 100 and on the other side by the twelfth section 114*b* of the sonic channel 100.

The one or more fan braces 66, 67, 68, and 69 may be affixed to the bottom surface of the soundboard 18*a* in order to direct and distribute the vibration from the strings 10 toward a center of a vibrating region of the soundboard 18*a*. The region is permitted to vibrate and produce the necessary vibratory amplitude, generating audible volume. Modifying the fan braces 66, 67, 68, and 69 allows for control over the flexibility of the soundboard 18*a*, and thus the audible volume produced by the guitar 1. The precise number and positions of the fan braces 66, 67, 68, and 69 could be varied depending on the specific embodiment of the soundboard 18*a*.

The bracing system described above and illustrated in FIGS. 4, 4A, 4B, 4C, and 4D comprises the following components: the X-braces 50 and 52, the bridge plate 54, the tone bars 56, the fretboard plate 58, the top brace 60, the angled braces 62, the horizontal brace 64, and the fan braces 66, 67, 68, and 69. Of course, as would be known to an artisan, a bracing system suitable for a particular soundboard 18*a* might include additional components or omit one or more of the identified components. Also as described above and illustrated, the sonic channel 100 substantially bounds each of the components of the bracing system. Of course, as would be known to an artisan, the sonic channel 100 could substantially bound some number fewer than all of the components of the bracing system.

The bracing system described above and illustrated in FIGS. 4, 4A, 4B, 4C, and 4D provides mechanical support to the soundboard 18*a* in resisting physical distortion due to the string tension and contributes to the conduction and distribution of vibration from the strings 10 to assist in even vibration of the resonant chamber of the guitar 1. The bracing system influences the flexibility of the soundboard 18*a* and, in turn, influences the volume-producing amplitude of the soundboard 18*a*. The bracing system allows for independent control over the rigidity and volume-producing flexibility of the soundboard 18*a*.

Figure 4A:
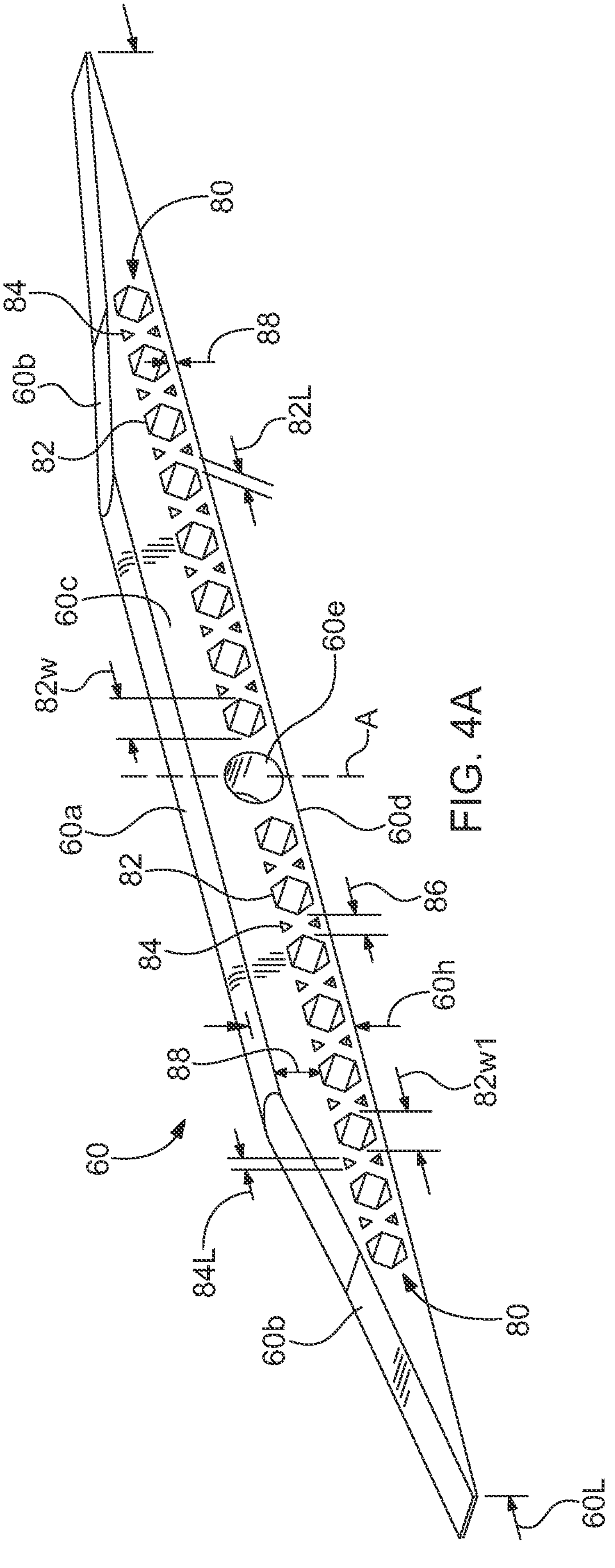
FIG. 4A is a perspective side view of the first (top) brace shown in FIG. 4.

FIG. 4A is a perspective side view of the first or top brace 60 shown in FIG. 4. The top brace 60 is centered along the longitudinal axis A of the soundboard 18*a* and, therefore, has the central axis A. Preferably made of an integral piece of wood, the top brace 60 has a curved or rounded center top portion 60*a* flanked by two substantially flat and tapered top portions 60*b*. The top brace 60 also has opposing side portions 60*c* and a bottom portion 60*d*. An orifice 60*e* is centrally located in the side portion 60*c* of the top brace 60 and spans the transition between the side portion 60*c* and the center top portion 60*a*. The orifice 60*e* functions to receive a truss rod (not shown). The orifice 60*e* is round and forms a circle in the embodiment shown in FIG. 4A.

A truss rod generally consists of a threaded rod, with nuts located on either end, which extends parallel to another rod or bar. By rotating the threaded rod in one direction or the other, the truss rod eventually begins to bend thereby causing the neck 4 and associated fretboard 24 to bend correspondingly. The truss rod is typically made of steel or titanium and has a diameter of about 0.16 inches (4 mm).

For the embodiment shown in FIG. 4A, and for purposes of example only, the top brace 60 has a length 60L of about 11.178 inches (28.3921 cm) and a height 60H of about 0.6252 inches (1.5880 cm). As illustrated, the top brace 60 has a plurality of voids 80 cut into and entirely through the side portions 60*c*. Although any suitable process can be used to cut the voids 80, a laser process is preferred. The number, size, shape, and location of the voids 80 are specifically predetermined to achieve a balance between the weight or mass of the top brace 60 (reducing the weight or mass) and the functional contributions of the top brace 60 to the soundboard 18*a*. By "predetermined" is meant determined beforehand, so that the predetermined characteristic must be determined, i.e., chosen or at least known, before the guitar 1 is manufactured.

Because the top brace 60 has the voids 80, the top brace 60 can be called "skeletonized." In other words, the voids 80 give the top brace 60 a skeleton form. The term "skeletonize" defines the process by which material is removed from a manufactured part (i.e., the top brace 60) to reduce overall weight while maintaining structural integrity. The process is common to many engineering applications including both finished products and initial prototypes.

In the embodiment of the top brace 60 illustrated in FIG. 4A, the voids 80 include an alternating pattern of hexagonal voids 82 and pairs of triangle voids 84. As illustrated, the pattern is symmetrical about the central axis A with seven pairs of triangle voids 84 alternating between eight hexagonal voids 82 on each side of the center orifice 60*e*. The pattern yields a total of fourteen solid, integral X-shaped regions within the top brace 60, with the upper triangle in the pairs of triangle voids 84 creating the top void in the X, the lower triangle in the pairs of triangle voids 84 creating the bottom void in the X, the left hexagonal void 82 creating the left side void in the X, and the right hexagonal void 82 creating the right side void in the X. Other patterns of voids 80 were investigated but were found to be inferior.

Preferably, although not necessarily, the hexagonal voids 82 are regular hexagons, defined as a polygon of six equal sides with interior angles that are all equal. The length 82L of each side of each hexagonal void 82 is about 0.100 inches (0.254 cm). The width 82W of each hexagonal void 82, which is the distance between opposing vertices, is about 0.2938 inches (0.7462 cm). The spacing distance 86 between adjacent hexagonal voids 82 is about 0.168 inches (0.4267 cm). As illustrated in FIG. 4A, the outermost hexagonal void 82 may be located under the tapered top portion 60*b* of the top brace 60. Such a location may require the outermost hexagonal void 82 to be slightly skewed, such that the width 82W1 of the outermost hexagonal void 82, defined as the distance between the opposing horizontal vertices, is about 0.2791 inches (0.7089 cm).

Preferably, although not necessarily, each triangle in the pairs of triangle voids 84 is an equilateral triangle, defined as a polygon of three equal sides with interior angles that are all equal. The length 84L of each side of each triangle in the pairs of triangle voids 84 is about 0.0819 inches (0.2080 cm). Also preferably, the voids 80 are centered along the height of the side portions 60*c* of the top brace 60. In the example illustrated in FIG. 4A, the tops of the hexagonal voids 82 and the tops of the pairs of triangle voids 84 are located a centering distance 88 of about 0.600 inches (0.1524 cm) below the top of the side portions 60*c*. The bottoms of the hexagonal voids 82 and the bottoms of the pairs of triangle voids 84 are located the same centering distance 88 of about 0.600 inches (0.1524 cm) above the bottom of the side portions 60*c*.

Figure 4B:
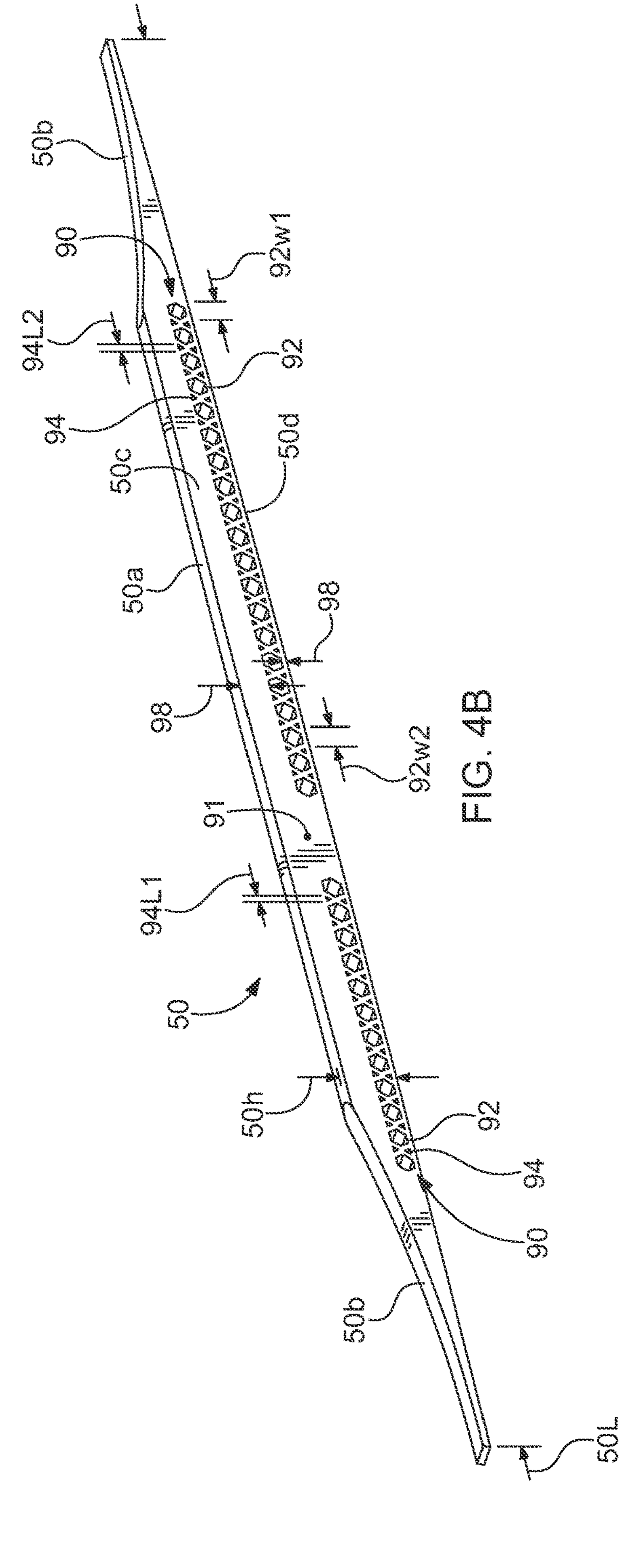
FIG. 4B is a perspective side view of one of the two cross braces shown in FIG. 4.

FIG. 4B is a perspective side view of one of the two X-braces 50, 52 shown in FIG. 4 (without the notch that each X-brace 50, 52 typically has). Because the two X-braces 50, 52 are identical, reference in FIG. 4B is made to the X-brace 50. Preferably made of an integral piece of wood, the X-brace 50 has a curved or rounded center top portion 50*a*, which slants downward slightly toward its end, flanked by two substantially flat and tapered top portions 50*b*. The X-brace 50 also has opposing side portions 50*c* and a bottom portion 50*d*.

For the embodiment shown in FIG. 4B, and for purposes of example only, the X-brace 50 has a length 50L of about 19.0 inches (48.26 cm) and a height 50H of about 0.6026 inches (1.5306 cm). As illustrated, the X-brace 50 has a plurality of voids 90 cut into and entirely through the side portions 50*c*. Although any suitable process can be used to cut the voids 90, a laser process is preferred. The number, size, shape, and location of the voids 90 are specifically predetermined to achieve a balance between the weight or mass of the X-brace 50 (reducing the weight or mass) and the functional contributions of the X-brace 50 to the soundboard 18*a*. Because the X-brace 50 has the voids 90, the X-brace 50 can be called skeletonized.

In the embodiment of the X-brace 50 illustrated in FIG. 4B, the voids 90 include an alternating pattern of hexagonal voids 92 and pairs of triangle voids 94. As illustrated, the pattern is not symmetrical about the center of the X-brace 50. Rather, the pattern includes nine pairs of triangle voids 94 alternating between ten hexagonal voids 92 on the portion of the X-brace 50 to the left of the point 91 at which the X-brace 50 crosses the X-brace 52 on the soundboard 18*a* (i.e., toward the neck end of the guitar 1) and nineteen pairs of triangle voids 94 alternating between twenty hexagonal voids 92 on the portion of the X-brace 50 to the right of the point 91 at which the X-brace 50 crosses the X-brace 52 on the soundboard 18*a* (i.e., toward the heel end of the guitar 1). The pattern yields nine solid, integral X-shaped regions within the X-brace 50 to the left of the point 91 and nineteen solid, integral X-shaped regions within the X-brace 50 to the right of the point 91, with the upper triangle in the pairs of triangle voids 94 creating the top void in the X, the lower triangle in the pairs of triangle voids 94 creating the bottom void in the X, the left hexagonal void 92 creating the left side void in the X, and the right hexagonal void 92 creating the right side void in the X. Other patterns of voids 90 were investigated but were found to be inferior.

Preferably, although not necessarily, the hexagonal voids 92 are regular hexagons. Because the center top portion 50*a* of the X-brace 50 slants downward slightly toward its end, however, the sizes of the hexagonal voids 92 vary. The width 92W1 of one hexagonal void 92, which is the distance between opposing vertices, is about 0.2137 inches (0.5427 cm). The width 92W2 of another hexagonal void 92 is about 0.2447 inches (0.6215 cm).

Preferably, although not necessarily, each triangle in the pairs of triangle voids 84 is an equilateral triangle. Because the center top portion 50*a* of the X-brace 50 slants downward slightly toward its end, however, the sizes of the triangles in the pairs of triangle voids 84 vary. The length 94L1 of each side of each triangle in one of the pairs of triangle voids 94 is about 0.0526 inches (0.1336 cm). The length 94L2 of each side of each triangle in another of the pairs of triangle voids 94 is about 0.0687 inches (0.1744 cm). Also preferably, the voids 90 are centered along the height of the side portions 50*c* of the X-brace 50. In the example illustrated in FIG. 4B, the tops of the hexagonal voids 92 and the tops of the pairs of triangle voids 94 are located a centering distance 98 of about 0.600 inches (0.1524 cm) below the top of the side portions 50*c*. The bottoms of the hexagonal voids 92 and the bottoms of the pairs of triangle voids 94 are located the same centering distance 98 of about 0.600 inches (0.1524 cm) above the bottom of the side portions 50*c*.

Figure 4C:
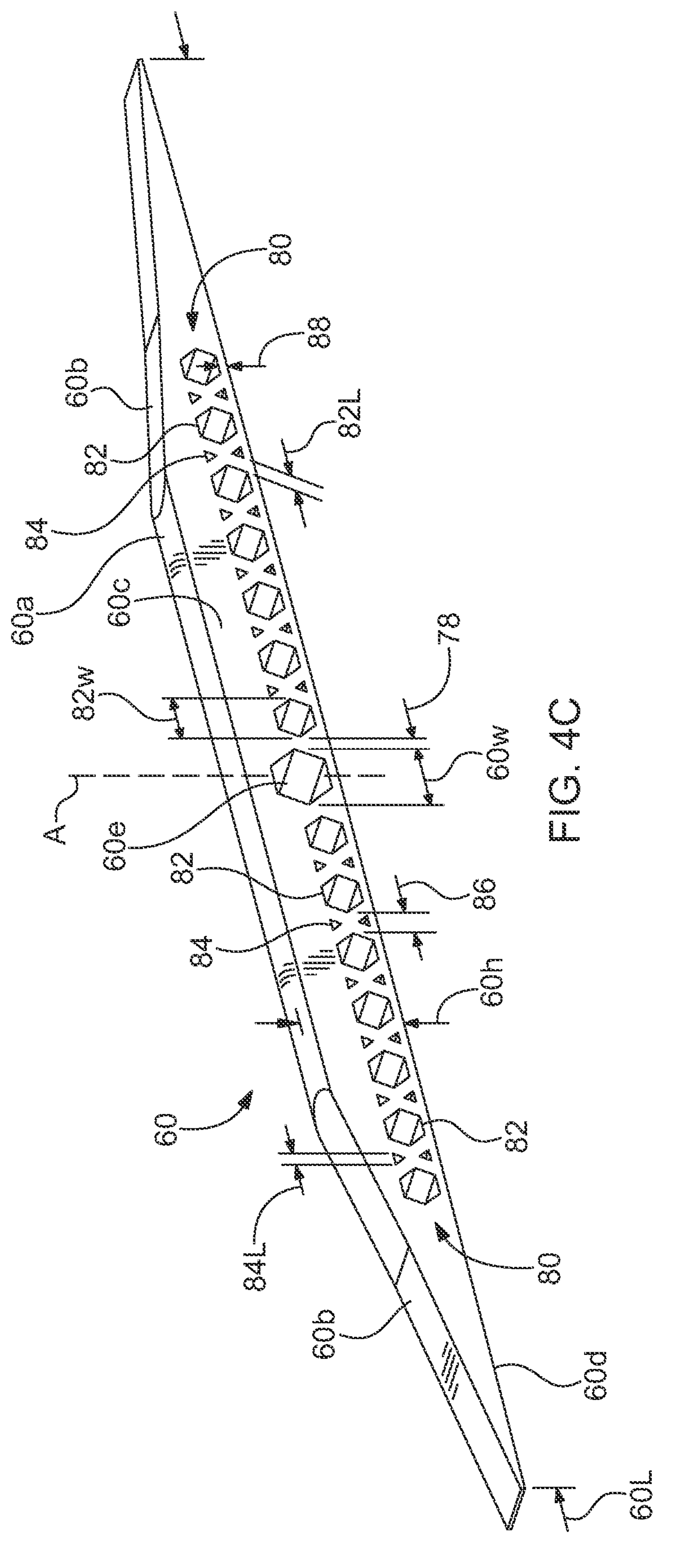
FIG. 4C is a side view of an alternative embodiment of the first (top) brace shown in FIG. 4.

FIG. 4C is a side view of an alternative embodiment, which can be compared to the embodiment shown in FIG. 4A, of the first or top brace 60 shown in FIG. 4. The top brace 60 is centered along the longitudinal axis A of the soundboard 18*a* and, therefore, has the central axis A. Preferably made of an integral piece of wood, the top brace 60 has a curved or rounded center top portion 60*a* flanked by two substantially flat and tapered top portions 60*b*. The top brace 60 also has opposing side portions 60*c* and a bottom portion 60*d*. An orifice 60*e* is centrally located in the side portion 60*c* of the top brace 60 and spans the transition between the side portion 60*c* and the center top portion 60*a*. The orifice 60*e* functions to receive a truss rod (not shown).

Unlike the circular orifice 60*e* of the embodiment of the top brace 60 shown in FIG. 4A, the orifice 60*e* of the embodiment shown in FIG. 4C has a hexagonal shape. The circular truss rod access hole is typically drilled in a machine room using a standard round drill bit. The hexagonal shape of the orifice 60*e* facilitates inclusion of the truss rod access hole in the laser program used to machine the skeletonized top brace 60. Of course, the circular orifice 60*e* accommodates a round truss rod; the hexagonal orifice 60*e* accommodates a hexagonal truss rod. The width 60*w* of the hexagonal orifice 60*e*, which is the distance between opposing vertices, is about 0.439 inches (1.1151 cm).

For the embodiment shown in FIG. 4C, and for purposes of example only, the top brace 60 has a length 60L of about 11.178 inches (28.3921 cm) and a height 60H of about 0.6252 inches (1.5880 cm). As illustrated, the top brace 60 has a plurality of voids 80 cut into and entirely through the side portions 60*c*. Although any suitable process can be used to cut the voids 80, a laser process is preferred. The number, size, shape, and location of the voids 80 are specifically predetermined to achieve a balance between the weight or mass of the top brace 60 (reducing the weight or mass) and the functional contributions of the top brace 60 to the soundboard 18*a*. The voids 80 give the top brace 60 a skeleton form.

In the embodiment of the top brace 60 illustrated in FIG. 4C, the voids 80 include an alternating pattern of hexagonal voids 82 and pairs of triangle voids 84. As illustrated, the pattern is symmetrical about the central axis A with six pairs of triangle voids 84 alternating between seven hexagonal voids 82 on each side of the center orifice 60*e*. The pattern yields a total of twelve solid, integral X-shaped regions within the top brace 60, with the upper triangle in the pairs of triangle voids 84 creating the top void in the X, the lower triangle in the pairs of triangle voids 84 creating the bottom void in the X, the left hexagonal void 82 creating the left side void in the X, and the right hexagonal void 82 creating the right side void in the X. Other patterns of voids 80 were investigated but were found to be inferior.

Preferably, although not necessarily, the hexagonal voids 82 are regular hexagons, defined as a polygon of six equal sides with interior angles that are all equal. The length 82L of each side of each hexagonal void 82 is about 0.100 inches (0.254 cm). The width 82W of each hexagonal void 82, which is the distance between opposing vertices, is about 0.289 inches (0.7341 cm). The spacing distance 86 between adjacent hexagonal voids 82 is about 0.165 inches (0.4191 cm). The spacing distance 78 between the center hexagonal orifice 60*e* and each of the two adjacent hexagonal voids 82 is about 0.091 inches (0.2311 cm).

Preferably, although not necessarily, each triangle in the pairs of triangle voids 84 is an equilateral triangle, defined as a polygon of three equal sides with interior angles that are all equal. The length 84L of each side of each triangle in the pairs of triangle voids 84 is about 0.084 inches (0.2134 cm). Also preferably, the voids 80 are centered along the height of the side portions 60*c* of the top brace 60. In the example illustrated in FIG. 4C, the tops of the hexagonal voids 82 and the tops of the pairs of triangle voids 84 are located a centering distance 88 of about 0.060 inches (0.0152 cm) below the top of the side portions 60*c*. The bottoms of the hexagonal voids 82 and the bottoms of the pairs of triangle voids 84 are located the same centering distance 88 of about 0.0600 inches (0.0152 cm) above the bottom of the side portions 60*c*.

Figure 4D:
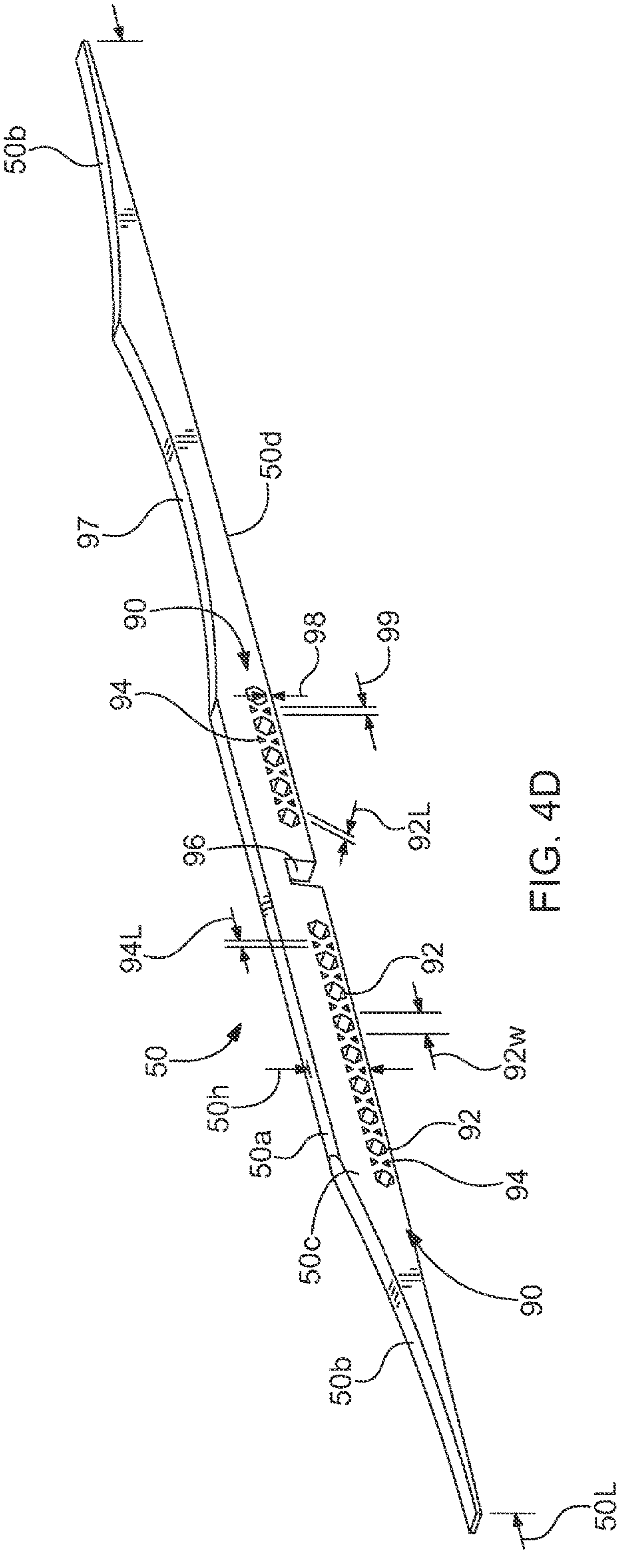
FIG. 4D is a side view of an alternative embodiment of one of the two cross braces shown in FIG. 4.

FIG. 4D is a side view of an alternative embodiment, which can be compared to the embodiment shown in FIG. 4B, of one of the two X-braces 50, 52 shown in FIG. 4. Reference in FIG. 4D is made to the X-brace 50 rather than to the X-brace 52. The X-braces 50, 52 are morticed or notched at the point where the X-braces 50, 52 cross so that they fit over or seat into one another. As shown in FIG. 4D, the X-brace 50 has a notch 96 formed in the bottom surface of the X-brace 50. The notch 96 is configured to engage a corresponding notch (not shown) formed in the top of the X-brace 52.

Preferably made of an integral piece of wood, the X-brace 50 has a curved or rounded center top portion 50*a*, which slants downward slightly toward its ends, flanked by two substantially flat and tapered top portions 50*b*. The X-brace 50 also has opposing side portions 50*c* and a bottom portion 50*d*. Unlike the X-brace 50 of the embodiment shown in FIG. 4B, the X-brace 50 shown in FIG. 4D has a scallop 97 formed between the rounded center top portion 50*a* and one of the substantially flat and tapered top portions 50*b*.

The scallop 97 can be created by shaving down or machining a portion of the X-brace 50 and essentially carving the scallop 97 out of the X-brace 50 which reduces the weight of the X-brace 50. The scallop 97 creates a section of the X-brace 50 that is shallow, so the X-brace 50 has greater flexibility, allowing the soundboard 18*a* to vibrate more freely in that section so the soundboard 18*a* is responsive to lighter playing with enhanced resonance. The scallop 97 also creates peaks that maintain stability while acting as damping nodes on specific tonal frequencies, in a manner similar to how a graphic equalizer sculpts the sound of a home stereo system.

For the embodiment shown in FIG. 4D, and for purposes of example only, the X-brace 50 has a length 50L of about 19.0 inches (48.26 cm) and a height 50H of about 0.6026 inches (1.5306 cm). As illustrated, the X-brace 50 has a plurality of voids 90 cut into and entirely through the side portions 50*c*. Although any suitable process can be used to cut the voids 90, a laser process is preferred. The number, size, shape, and location of the voids 90 are specifically predetermined to achieve a balance between the weight or mass of the X-brace 50 (reducing the weight or mass) and the functional contributions of the X-brace 50 to the soundboard 18*a*. Because the X-brace 50 has the voids 90, the X-brace 50 can be called skeletonized.

In the embodiment of the X-brace 50 illustrated in FIG. 4D, the voids 90 include an alternating pattern of hexagonal voids 92 and pairs of triangle voids 94. As illustrated, the pattern is not symmetrical about the center of the X-brace 50. Rather, the pattern includes eight pairs of triangle voids 94 alternating between nine hexagonal voids 92 on the portion of the X-brace 50 to the left of the notch 96 at which the X-brace 50 crosses the X-brace 52 on the soundboard 18*a* (i.e., toward the neck end of the guitar 1) and four pairs of triangle voids 94 alternating between five hexagonal voids 92 on the portion of the X-brace 50 to the right of the notch 96 at which the X-brace 50 crosses the X-brace 52 on the soundboard 18*a* (i.e., toward the heel end of the guitar 1). The pattern yields eight solid, integral X-shaped regions within the X-brace 50 to the left of the notch 96 and four solid, integral X-shaped regions within the X-brace 50 to the right of the notch 96, with the upper triangle in the pairs of triangle voids 94 creating the top void in the X, the lower triangle in the pairs of triangle voids 94 creating the bottom void in the X, the left hexagonal void 92 creating the left side void in the X, and the right hexagonal void 92 creating the right side void in the X. Other patterns of voids 90 were investigated but were found to be inferior.

Preferably, although not necessarily, the hexagonal voids 92 are regular hexagons. The width 92W of one hexagonal void 92, which is the distance between opposing vertices, is about 0.221 inches (0.5613 cm). The length 92L of each side of each hexagonal void 92 is about 0.085 inches (0.2159 cm).

Preferably, although not necessarily, each triangle in the pairs of triangle voids 94 is an equilateral triangle. The length 94L of each side of each triangle in one of the pairs of triangle voids 94 is about 0.079 inches (0.2007 cm). Also preferably, the voids 90 are centered along the height of the side portions 50*c* of the X-brace 50. In the example illustrated in FIG. 4D, the tops of the hexagonal voids 92 and the tops of the pairs of triangle voids 94 are located a centering distance 98 of about 0.060 inches (0.0152 cm) below the top of the side portions 50*c*. The bottoms of the hexagonal voids 92 and the bottoms of the pairs of triangle voids 94 are located the same centering distance 98 of about 0.060 inches (0.0152 cm) above the bottom of the side portions 50*c*. The distance 99 between one end of one of the hexagonal voids 92 and the opposite end of an adjacent pair of triangle voids 94 is about 0.154 inches (0.3912 cm).

The soundboard 18*a* with the sonic channel 100 and skeletonized bracing is strong and stable. The sonic channel 100 and skeletonized bracing result in greater flexibility in strategic areas of the soundboard 18*a* to produce a desired tonal effect.

The sonic channel 100 and skeletonized bracing achieve an improvement in tonal response in comparison to conventionally built acoustic stringed instruments. The sonic channel 100 and skeletonized bracing can be discretely applied to different acoustic stringed instrument body shapes and bracing styles. Another advantage relative to the known art is that the sonic channel 100 and skeletonized bracing target specific regions of the soundboard 18*a* to maximize the desired tonal effect. The sonic channel 100 and skeletonized bracing allow for tonal optimization based on body shape.

C. Instrument Back

Figure 5:
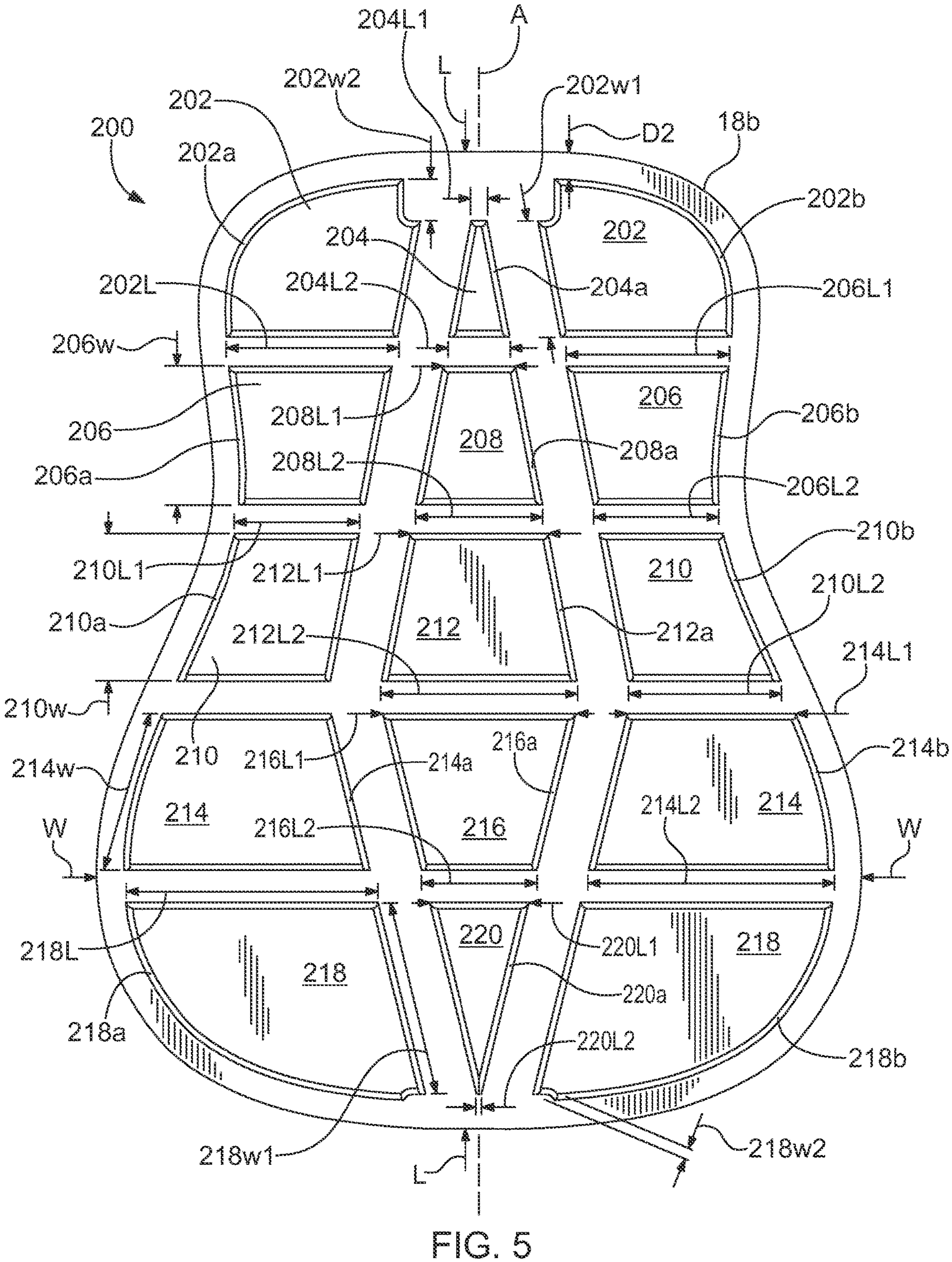
FIG. 5 is a plan view of the upper surface of a guitar back illustrating one embodiment of a sonic channel.

Highlighted in FIG. 5 is the upper surface of the rear plate (guitar bottom or back) 18*b* illustrating one embodiment of a second sonic channel 200 formed in the back 18*b*. The upper surface is the top or inside surface of the back 18*b*, which is the surface of the back 18*b* that helps to define the sound chamber. The sonic channel 200 is formed in the back 18*b* using any conventional manufacturing process. Mechanical cutting, laser cutting, and abrasive removal using an abrasive wheel are three example manufacturing processes, as would be known to an artisan. Routing is a preferred process to form the sonic channel 200 in the back 18*b*.

In one example embodiment, as illustrated in FIG. 5, the maximum width W of the body 2 (which occurs in the lower bout 32) and, therefore, of the back 18*b* is about 16 inches (40 cm) and the length L of the body 2 is about 20.5 inches (52 cm). In the example embodiment shown in FIG. 5, the sonic channel 200 of the back 18*b* is about 0.125±0.003 inches (0.3175±0.0076 cm) wide and about 0.030±0.003 inches (0.076±0.0076 cm) deep. The sonic channel 200 includes fifteen, separate, discrete sections, as illustrated, with each section defining an area or footprint on the back 18*b*. The fifteen sections are grouped substantially into five rows “R” and three columns “C.”

The first section 202*a* of the sonic channel 200 is located in the top or first row (R1) and in the left or first column (C1). The first section 202*a* defines a substantially triangle or pie-shaped first area 202 with three legs. In the example illustrated, the first section 202*a* has a length 202L, which defines the extent of the substantially straight and horizontal first leg of the first section 202*a*, of about 3.5054 inches (8.9037 cm). A second leg of the first section 202*a* defines the width of the first section 202*a* and has two substantially straight portions connected and offset by a bend to accommodate the top center of the body 2 proximate the neck end of the body 2. The first portion of the second leg extends a linear distance 202W1 of about 2.4266 inches (6.1635 cm). The second portion of the second leg extends a linear distance 202W2 of about 0.8577 inches (2.1785 cm). A third leg of the first section 202*a* is located proximate the outer perimeter of the back 18*b* and is substantially curved to follow the contour of that outer perimeter.

The second section 202*b* of the sonic channel 200 is located in the top or first row (R1) and in the right or third column (C3). The second section 202*b* is the mirror image of the first section 202*a* of the sonic channel 200. The first section 202*a* and the second section 202*b* are symmetrically located on opposite sides of the common longitudinal axis A of the soundboard 18*a* and the back 18*b*. Like the first section 202*a*, the second section 202*b* defines a substantially triangle or pie-shaped first area 202. The distance D2 from the top of each of the first section 202*a* and the second section 202*b* to the heel end of the body 2 is about 0.5481 inches (1.3921 cm).

The third section 204*a* of the sonic channel 200 is located in the top or first row (R1) and in the middle or second column (C2). The third section 204*a* defines a substantially trapezoid-shaped third area 204 that is centered along the longitudinal axis A. In the example illustrated, the third section 204*a* has a maximum length 204L2, which defines the extent of the longer of the two substantially straight and parallel legs of the third section 204*a*, of about 1.2532 inches (3.1831 cm). The length 204L1 of the shorter of the two substantially straight and parallel legs of the third section 204*a* is about 0.3176 inches (0.8067 cm). Two substantially straight portions of the third section 204*a* angle inward and upward from the longer parallel leg to the shorter parallel leg.

The fourth section 206*a* of the sonic channel 200 is located in the second row (R2) and in the left or first column (C1). The fourth section 206*a* defines a substantially trapezoid-shaped fourth area 206 and is positioned under the first section 202*a*. In the example illustrated, the fourth section 206*a* has a maximum length 206L1, which defines the extent of the longer of the two substantially straight and parallel legs of the fourth section 206*a*, of about 3.3402 inches (8.4841 cm). The length 206L2 of the shorter of the two substantially straight and parallel legs of the fourth section 206*a* is about 2.5739 inches (6.5377 cm). The fourth section 206*a* has a width 206W, which defines the extent of the substantially straight, non-parallel leg of the fourth section 206*a*, of about 2.8867 inches (7.3322 cm). The other non-parallel leg of the fourth section 206*a* is located proximate the outer perimeter of the back 18*b* and is substantially curved to follow the contour of that outer perimeter.

The fifth section 206*b* of the sonic channel 200 is located in the second row (R2) and in the right or third column (C3). The fifth section 206*b* is the mirror image of the fourth section 206*a* of the sonic channel 200 and is positioned under the second section 202*b*. The fourth section 206*a* and the fifth section 206*b* are symmetrically located on opposite sides of the common longitudinal axis A of the soundboard 18*a* and the back 18*b*. Like the fourth section 206*a*, the fifth section 206*b* defines a substantially trapezoid-shaped fourth area 206.

The sixth section 208*a* of the sonic channel 200 is located in the second row (R2) and in the middle or second column (C2). The sixth section 208*a* is positioned under the third section 204*a*. The sixth section 208*a* defines a substantially trapezoid-shaped sixth area 208 that is centered along the longitudinal axis A. In the example illustrated, the sixth section 208*a* has a maximum length 208L2, which defines the extent of the longer of the two substantially straight and parallel legs of the sixth section 208*a*, of about 2.5958 inches (6.5933 cm). The length 208L1 of the shorter of the two substantially straight and parallel legs of the sixth section 208*a* is about 1.4879 inches (3.7792 cm). Two substantially straight portions of the sixth section 208*a* angle inward and upward from the longer parallel leg to the shorter parallel leg.

The seventh section 210*a* of the sonic channel 200 is located in the third row (R3) and in the left or first column (C1). The seventh section 210*a* defines a substantially trapezoid-shaped seventh area 210 and is positioned under the fourth section 206*a*. In the example illustrated, the seventh section 210*a* has a maximum length 210L2, which defines the extent of the longer of the two substantially straight and parallel legs of the seventh section 210*a*, of about 3.1388 inches (7.9725 cm). The length 210L1 of the shorter of the two substantially straight and parallel legs of seventh section 210*a* is about 2.5538 inches (6.4866 cm). The seventh section 210*a* has a width 210W, which defines the extent of the substantially straight, non-parallel leg of the seventh section 210*a*, of about 3.0774 inches (7.8165 cm). The other non-parallel leg of the seventh section 210*a* is located proximate the outer perimeter of the back 18*b* and is substantially curved to follow the contour of that outer perimeter.

The eighth section 210*b* of the sonic channel 200 is located in the third row (R3) and in the right or third column (C3). The eighth section 210*b* is the mirror image of the seventh section 210*a* of the sonic channel 200 and is positioned under the fifth section 206*b*. The seventh section 210*a* and the eighth section 210*b* are symmetrically located on opposite sides of the common longitudinal axis A of the soundboard 18*a* and the back 18*b*. Like the seventh section 210*a*, the eighth section 210*b* defines a substantially trapezoid-shaped seventh area 210.

The ninth section 212*a* of the sonic channel 200 is located in the third row (R3) and in the middle or second column (C2). The ninth section 212*a* is positioned under the sixth section 208*a*. The ninth section 212*a* defines a substantially trapezoid-shaped ninth area 212 that is centered along the longitudinal axis A. In the example illustrated, the ninth section 212*a* has a maximum length 212L2, which defines the extent of the longer of the two substantially straight and parallel legs of the ninth section 212*a*, of about 4.0116 inches (10.1894 cm). The length 212L1 of the shorter of the two substantially straight and parallel legs of the ninth section 212*a* is about 2.8304 inches (7.1892 cm). Two substantially straight portions of the ninth section 212*a* angle inward and upward from the longer parallel leg to the shorter parallel leg.

The tenth section 214*a* of the sonic channel 200 is located in the fourth row (R4) and in the left or first column (C1). The tenth section 214*a* defines a substantially trapezoid-shaped tenth area 214 and is positioned under the seventh section 210*a*. In the example illustrated, the tenth section 214*a* has a maximum length 214L2, which defines the extent of the longer of the two substantially straight and parallel legs of the seventh section 210*a*, of about 5.0362 inches (12.7919 cm). The length 214L1 of the shorter of the two substantially straight and parallel legs of tenth section 214*a* is about 3.4574 inches (8.7817 cm). The tenth section 214*a* has a width 214W, which defines the extent of the substantially straight, non-parallel leg of the tenth section 214*a*, of about 3.3113 inches (8.4107 cm). The other non-parallel leg of tenth section 214*a* is located proximate the outer perimeter of the back 18*b* and is substantially curved to follow the contour of that outer perimeter.

The eleventh section 214*b* of the sonic channel 200 is located in the fourth row (R4) and in the right or third column (C3). The eleventh section 214*b* is the mirror image of the tenth section 214*a* of the sonic channel 200 and is positioned under the eighth section 210*b*. The tenth section 214*a* and the eleventh section 214*b* are symmetrically located on opposite sides of the common longitudinal axis A of the soundboard 18*a* and the back 18*b*. Like the tenth section 214*a*, the eleventh section 214*b* defines a substantially trapezoid-shaped tenth area 214.

The twelfth section 216*a* of the sonic channel 200 is located in the fourth row (R4) and in the middle or second column (C2). The twelfth section 216*a* is positioned under the ninth section 212*a*. The twelfth section 216*a* defines a substantially trapezoid-shaped twelfth area 216 that is centered along the longitudinal axis A. In the example illustrated, the twelfth section 216*a* has a maximum length 216L1, which defines the extent of the longer of the two substantially straight and parallel legs of the twelfth section 216*a*, of about 3.9583 inches (10.0540 cm). The length 216L2 of the shorter of the two substantially straight and parallel legs of the twelfth section 216*a* is about 2.3687 inches (6.0164 cm). Two substantially straight portions of the twelfth section 216*a* angle inward and downward from the longer parallel leg to the shorter parallel leg.

The thirteenth section 218*a* of the sonic channel 200 is located in the bottom or fifth row (R5) and in the left or first column (C1). The thirteenth section 218*a* defines a substantially triangle or pie-shaped thirteenth area 218 with three legs. In the example illustrated, the thirteenth section 218*a* has a length 218L, which defines the extent of the substantially straight and horizontal first leg of the thirteenth section 218*a*, of about 5.1647 inches (13.1183 cm). A second leg of the thirteenth section 218*a* defines the width of the thirteenth section 218*a* and has a substantially straight first portion connected to and offset by a bend portion to accommodate the bottom center of the body 2 proximate the heel end of the body 2. The first portion of the second leg extends a linear distance 218W1 of about 4.0549 inches (10.2994 cm). The bend portion of the second leg extends a linear distance 218W2 of about 0.1213 inches (0.3081 cm). A third leg of the thirteenth section 218*a* is located proximate the outer perimeter of the back 18*b* and is substantially curved to follow the contour of that outer perimeter.

The fourteenth section 218*b* of the sonic channel 200 is located in the bottom or fifth row (R5) and in the right or third column (C3). The fourteenth section 218*b* is the mirror image of the thirteenth section 218*a* of the sonic channel 200 and is positioned under the eleventh section 214*b*. The thirteenth section 218*a* and the fourteenth section 218*b* are symmetrically located on opposite sides of the common longitudinal axis A of the soundboard 18*a* and the back 18*b*. Like the thirteenth section 218*a*, the fourteenth section 218*b* defines a substantially triangle or pie-shaped thirteenth area 218.

The fifteenth section 220*a* of the sonic channel 200 is located in the bottom or fifth row (R5) and in the middle or second column (C2). The fifteenth section 220*a* is positioned under the twelfth section 216*a*. The fifteenth section 220*a* defines a substantially trapezoid-shaped fifteenth area 220 that is centered along the longitudinal axis A. In the example illustrated, the fifteenth section 220*a* has a maximum length 220L1, which defines the extent of the longer of the two substantially straight and parallel legs of the fifteenth section 220*a*, of about 2.0411 inches (5.1843 cm). The length 220L2 of the shorter of the two substantially straight and parallel legs of the fifteenth section 220*a* is about 0.0946 inches (0.2402 cm). Two substantially straight portions of the fifteenth section 220*a* angle inward and downward from the longer parallel leg to the shorter parallel leg.

As stated above, the guitar body 2 is typically made of wood. According to other embodiments, however, the guitar body 2 may be made of plastic, graphite, or other appropriate materials. The sonic channel 200 is applicable to wood materials as well as alternative materials including, but not limited to composite, carbon fiber, and laminate, and could be formed directly into such materials without necessitating any type of cut.

The precise geometry of the sonic channel 200 can be adjusted, in combination with (among other structural characteristics of the guitar 1) the skeletonized bracing that is also located on the upper surface of the guitar back 18*b*, to achieve desired tonal qualities. The back 18*b* of the guitar 1 is braced to help distribute the force exerted by the neck 4 on the body 2, and to maintain the tonal responsiveness and structural integrity of the sound box. Braces may be made from top woods (spruce or cedar), balsa wood or, in certain instruments, carbon fiber composites.

Figure 6:
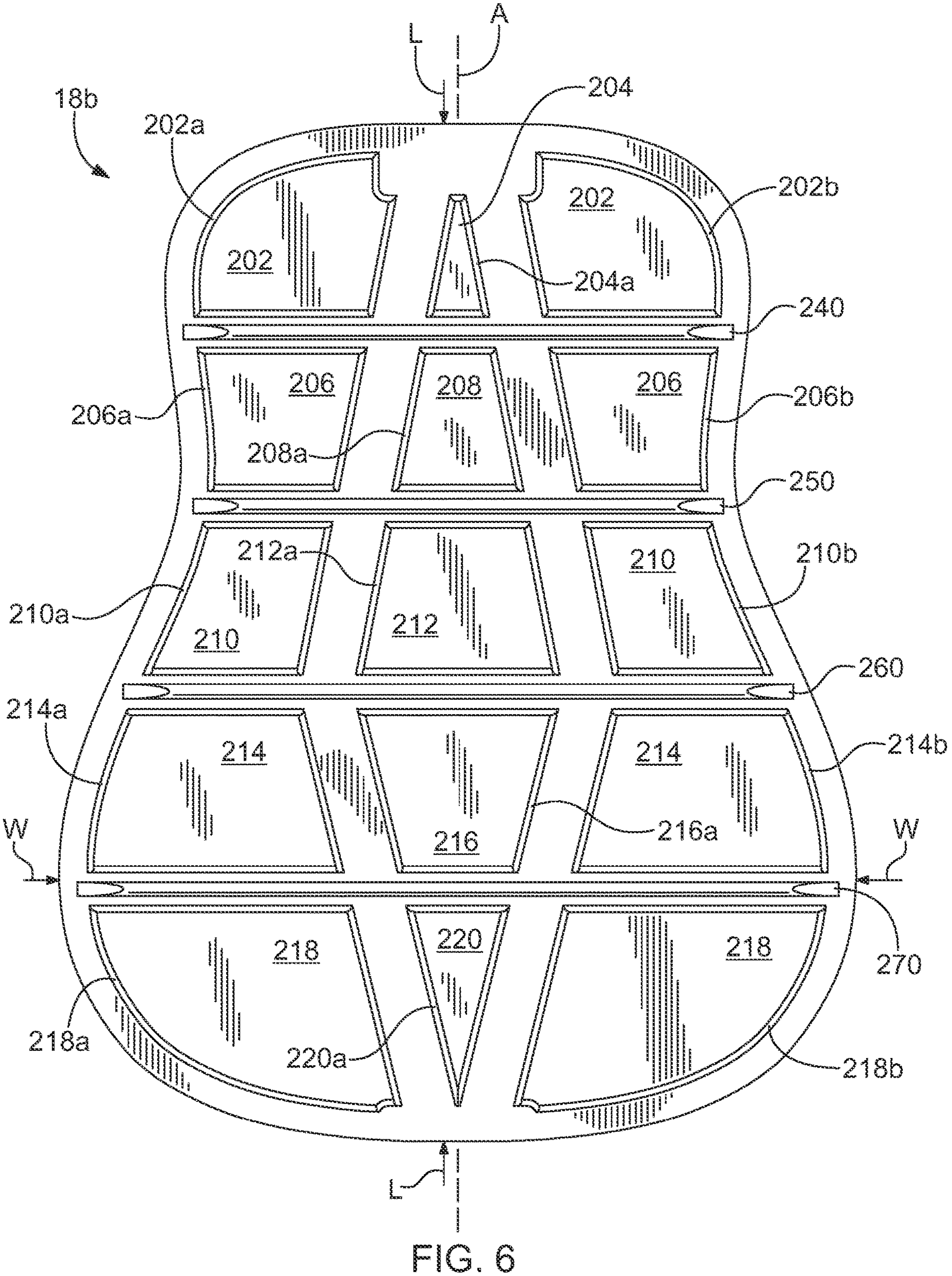
FIG. 6 is a plan view of the upper surface of the guitar back shown in FIG. 5 to which has been added one embodiment of skeletonized back braces.

FIG. 6 is a plan view of the upper surface of the guitar back 18*b* shown in FIG. 5 to which has been added one embodiment of skeletonized back braces. The back bracing system consists of four back braces: the first back brace 240, the second back brace 250, the third back brace 260, and the fourth back brace 270. More details about the construction of the four back braces 240, 250, 260, and 270 are provided below in the context of FIGS. 6A, 6B, 6C, and 6D, respectively.

Each of the four back braces 240, 250, 260, and 270 is affixed to the upper surface of the guitar back 18*b* and is centered along the longitudinal axis A that is common to the soundboard 18*a* and to the back 18*b* and, therefore, has the central axis A. Each of the four back braces 240, 250, 260, and 270 extends horizontally from one peripheral edge of the back 18*b* and across the back 18*b* to the opposite peripheral edge of the back 18*b*. The top or first back brace 240 is located in the upper bout 30 of the guitar 1. The other three back braces 250, 260, and 270 are located in the lower bout 32 of the guitar 1.

As illustrated, the first back brace 240 is bounded on one side by the first section 202*a*, the second section 202*b*, and the third section 204*a* of the sonic channel 200 and on its opposite side by the fourth section 206*a*, the fifth section 206*b*, and the sixth section 208*a* of the sonic channel 200. Thus, the first back brace 240 is located between the first and second rows (R1 and R2) of the sonic channel 200. The second back brace 250 is bounded on one side by the fourth section 206*a*, the fifth section 206*b*, and the sixth section 208*a* of the sonic channel 200 and on its opposite side by the seventh section 210*a*, the eighth section 210*b*, and the ninth section 212*a* of the sonic channel 200. Thus, the second back brace 250 is located between the second and third rows (R2 and R3) of the sonic channel 200. The third back brace 260 is bounded on one side by the seventh section 210*a*, the eighth section 210*b*, and the ninth section 212*a* of the sonic channel 200 and on its opposite side by the tenth section 214*a*, the eleventh section 214*b*, and the twelfth section 216*a* of the sonic channel 200. Thus, the third back brace 260 is located between the third and fourth rows (R3 and R4) of the sonic channel 200. The fourth back brace 270 is bounded on one side by the tenth section 214*a*, the eleventh section 214*b*, and the twelfth section 216*a* of the sonic channel 200 and on its opposite side by the thirteenth section 218*a*, the fourteenth section 218*b*, and the fifteenth section 220*a* of the sonic channel 200. Thus, the fourth back brace 270 is located between the fourth and fifth rows (R4 and R5) of the sonic channel 200.

The back bracing system described above and illustrated in FIGS. 6, 6A, 6B, 6C, and 6D comprises the following components: the first back brace 240, the second back brace 250, the third back brace 260, and the fourth back brace 270. Of course, as would be known to an artisan, a back bracing system suitable for a particular back 18*b* might include additional components or omit one or more of the identified components. Also as described above and illustrated, the sonic channel 200 substantially bounds each of the components of the back bracing system. Of course, as would be known to an artisan, the sonic channel 200 could substantially bound some number fewer than all of the components of the back bracing system.

The back bracing system described above and illustrated in FIGS. 6, 6A, 6B, 6C, and 6D provides mechanical support to the back 18*b* in resisting physical distortion due to the string tension and contributes to the conduction and distribution of vibration from the strings 10 to assist in even vibration of the resonant chamber of the guitar 1. The back bracing system influences the flexibility of the back 18*b* and, in turn, influences the volume producing amplitude of the guitar 1. The back bracing system allows for independent control over the rigidity and volume-producing flexibility of the guitar 1.

Figure 6A:
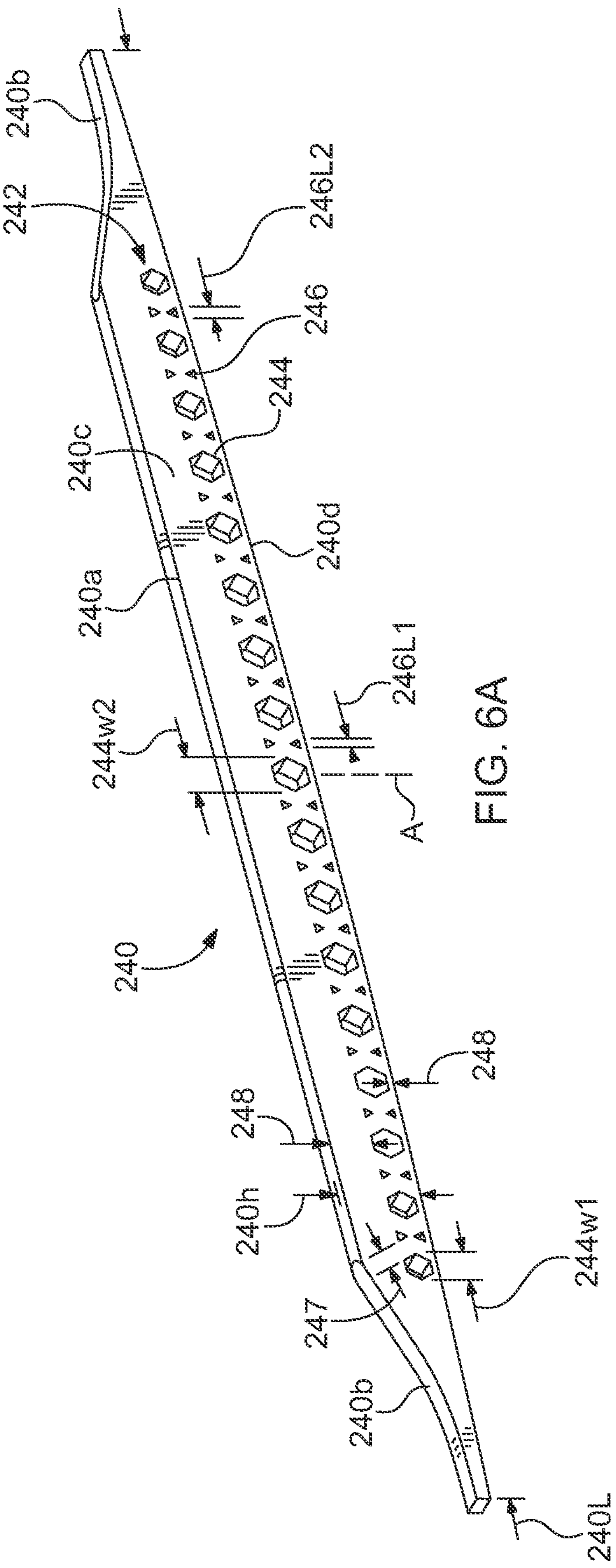
FIG. 6A is a perspective side view of the first (top) back brace shown in FIG. 6.

FIG. 6A is a perspective side view of the top or first back brace 240 shown in FIG. 6. Preferably made of an integral piece of wood, the first back brace 240 has a rounded center top portion 240*a* flanked by two substantially flat and tapered top portions 240*b*. The first back brace 240 also has opposing side portions 240*c* and a bottom portion 240*d* that is slightly slanted upward toward each end. For the embodiment shown in FIG. 6A, and for purposes of example only, the first back brace 240 has a length 240L of about 11.145 inches (28.3083 cm) and a height 240H of about 0.5982 inches (1.5194 cm). As illustrated, the first back brace 240 has a plurality of voids 242 cut into and entirely through the side portions 240*c*. The voids 242 give the first back brace 240 a skeleton form. The number, size, shape, and location of the voids 242 are specifically predetermined to achieve a balance between the weight or mass of the first back brace 240 (reducing the weight or mass) and the functional contributions of the first back brace 240 to the back 18*b*.

In the embodiment of the first back brace 240 illustrated in FIG. 6A, the voids 242 include an alternating pattern of hexagonal voids 244 and pairs of triangle voids 246. As illustrated, the pattern is symmetrical about the central axis A and includes sixteen pairs of triangle voids 246 alternating between seventeen hexagonal voids 244. The pattern yields sixteen solid, integral X-shaped regions within the first back brace 240, with the upper triangle in the pairs of triangle voids 246 creating the top void in the X, the lower triangle in the pairs of triangle voids 246 creating the bottom void in the X, the left hexagonal void 244 creating the left side void in the X, and the right hexagonal void 244 creating the right side void in the X. Other patterns of voids 242 were investigated but were found to be inferior.

Preferably, although not necessarily, the hexagonal voids 244 are regular hexagons. Because the bottom portion 240*d* of the first back brace 240 slants slightly upward at its ends, however, the sizes of the hexagonal voids 244 vary. The width 244W1 of one hexagonal void 244, which is the distance between opposing vertices, is about 0.2641 inches (0.6708 cm). The width 244W2 of another hexagonal void 244 (namely, the center hexagonal void 244) is about 0.2951 inches (0.7495 cm).

Preferably, although not necessarily, each triangle in the pairs of triangle voids 246 is an equilateral triangle. Because the bottom portion 240*d* of the first back brace 240 slants slightly upward at its ends, however, the sizes of the triangles in the pairs of triangle voids 246 vary. The length 246L1 of each side of each triangle in one of the pairs of triangle voids 246 is about 0.0890 inches (0.2260 cm). The length 246L2 of each side of each triangle in another of the pairs of triangle voids 246 is about 0.1012 inches (0.2570 cm).

The spacing 247 between one side of one hexagonal void 244 and the facing side of an adjacent triangle in the pairs of triangle voids 246 is about 0.07 inches (0.1778 cm). Also preferably, the voids 242 are centered along the height of the side portions 240*c* of the first back brace 240. In the example illustrated in FIG. 6A, the tops of the hexagonal voids 244 and the tops of the pairs of triangle voids 246 are located a centering distance 248 of about 0.600 inches (0.1524 cm) below the top of the side portions 240*c*. The bottoms of the hexagonal voids 244 and the bottoms of the pairs of triangle voids 246 are located the same centering distance 248 of about 0.600 inches (0.1524 cm) above the bottom of the side portions 240*c*.

Figure 6B:
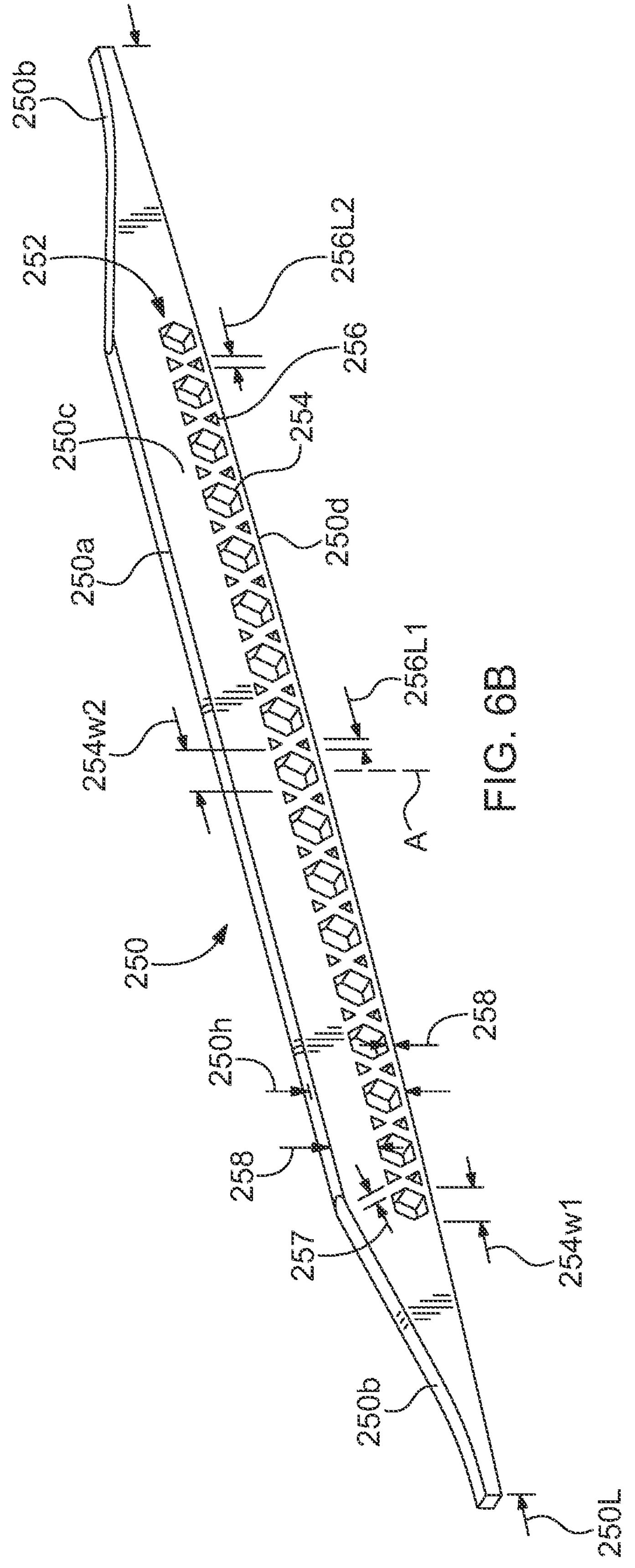
FIG. 6B is a perspective side view of the second (from the top) back brace shown in FIG. 6.

FIG. 6B is a perspective side view of the second back brace 250 shown in FIG. 6. Preferably made of an integral piece of wood, the second back brace 250 has a rounded center top portion 250*a* flanked by two substantially flat and tapered top portions 250*b*. The second back brace 250 also has opposing side portions 250*c* and a bottom portion 250*d* that is slightly slanted upward toward each end. For the embodiment shown in FIG. 6B, and for purposes of example only, the second back brace 250 has a length 250L of about 10.6800 inches (27.1272 cm) and a height 250H of about 0.5769 inches (1.4653 cm). As illustrated, the second back brace 250 has a plurality of voids 252 cut into and entirely through the side portions 250*c*. The voids 252 give the second back brace 250 a skeleton form. The number, size, shape, and location of the voids 252 are specifically predetermined to achieve a balance between the weight or mass of the second back brace 250 (reducing the weight or mass) and the functional contributions of the second back brace 250 to the back 18*b*.

In the embodiment of the second back brace 250 illustrated in FIG. 6B, the voids 252 include an alternating pattern of hexagonal voids 254 and pairs of triangle voids 256. As illustrated, the pattern is symmetrical about the central axis A and includes sixteen pairs of triangle voids 256 alternating between seventeen hexagonal voids 254. The pattern yields sixteen solid, integral X-shaped regions within the second back brace 250, with the upper triangle in the pairs of triangle voids 256 creating the top void in the X, the lower triangle in the pairs of triangle voids 256 creating the bottom void in the X, the left hexagonal void 254 creating the left side void in the X, and the right hexagonal void 254 creating the right side void in the X. Other patterns of voids 252 were investigated but were found to be inferior.

Preferably, although not necessarily, the hexagonal voids 254 are regular hexagons. Because the bottom portion 250*d* of the second back brace 250 slants slightly upward at its ends, however, the sizes of the hexagonal voids 254 vary. The width 254W1 of one hexagonal void 254, which is the distance between opposing vertices, is about 0.2396 inches (0.6085 cm). The width 254W2 of another hexagonal void 254 (namely, the center hexagonal void 254) is about 0.2956 inches (0.7508 cm).

Preferably, although not necessarily, each triangle in the pairs of triangle voids 256 is an equilateral triangle. Because the bottom portion 250*d* of the second back brace 250 slants slightly upward at its ends, however, the sizes of the triangles in the pairs of triangle voids 256 vary. The length 256L1 of each side of each triangle in one of the pairs of triangle voids 256 is about 0.0709 inches (0.1800 cm). The length 256L2 of each side of each triangle in another of the pairs of triangle voids 256 is about 0.0952 inches (0.2418 cm).

The spacing 257 between one side of one hexagonal void 254 and the facing side of an adjacent triangle in the pairs of triangle voids 256 is about 0.07 inches (0.1778 cm). Also preferably, the voids 252 are centered along the height of the side portions 250*c* of the second back brace 250. In the example illustrated in FIG. 6B, the tops of the hexagonal voids 254 and the tops of the pairs of triangle voids 256 are located a centering distance 258 of about 0.600 inches (0.1524 cm) below the top of the side portions 250*c*. The bottoms of the hexagonal voids 254 and the bottoms of the pairs of triangle voids 256 are located the same centering distance 258 of about 0.600 inches (0.1524 cm) above the bottom of the side portions 250*c*.

Figure 6C:
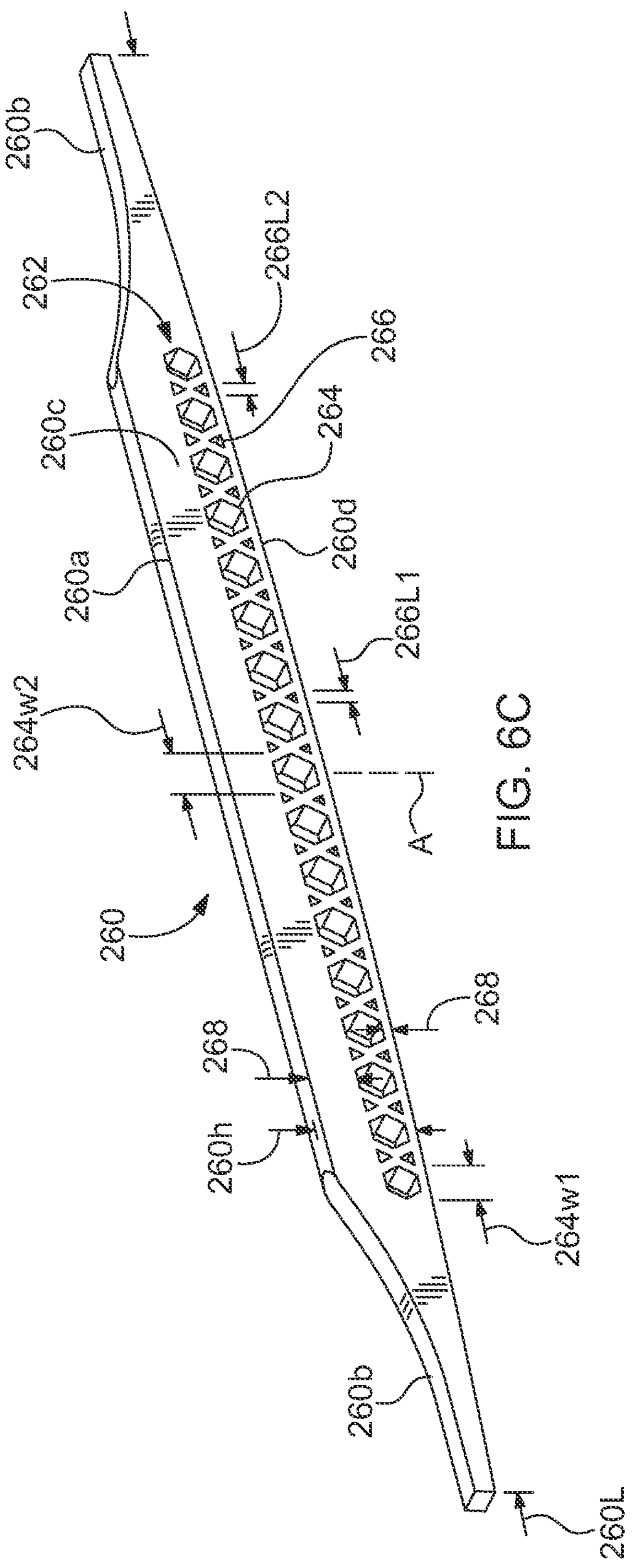
FIG. 6C is a perspective side view of the third (from the top) back brace shown in FIG. 6.

FIG. 6C is a perspective side view of the third back brace 260 shown in FIG. 6. Preferably made of an integral piece of wood, the third back brace 260 has a rounded center top portion 260*a* flanked by two substantially flat and tapered top portions 260*b*. The third back brace 260 also has opposing side portions 260*c* and a bottom portion 260*d* that is slightly slanted upward toward each end. For the embodiment shown in FIG. 6C, and for purposes of example only, the third back brace 260 has a length 260L of about 13.6450 inches (34.6583 cm) and a height 260H of about 0.7057 inches (1.7924 cm). As illustrated, the third back brace 260 has a plurality of voids 262 cut into and entirely through the side portions 260*c*. The voids 262 give the third back brace 260 a skeleton form. The number, size, shape, and location of the voids 262 are specifically predetermined to achieve a balance between the weight or mass of the third back brace 260 (reducing the weight or mass) and the functional contributions of the third back brace 260 to the back 18*b*.

In the embodiment of the third back brace 260 illustrated in FIG. 6C, the voids 262 include an alternating pattern of hexagonal voids 264 and pairs of triangle voids 266. As illustrated, the pattern is symmetrical about the central axis A and includes sixteen pairs of triangle voids 266 alternating between seventeen hexagonal voids 264. The pattern yields sixteen solid, integral X-shaped regions within the third back brace 260, with the upper triangle in the pairs of triangle voids 266 creating the top void in the X, the lower triangle in the pairs of triangle voids 266 creating the bottom void in the X, the left hexagonal void 264 creating the left side void in the X, and the right hexagonal void 264 creating the right side void in the X. Other patterns of voids 262 were investigated but were found to be inferior.

Preferably, although not necessarily, the hexagonal voids 264 are regular hexagons. Because the bottom portion 260*d* of the third back brace 260 slants slightly upward at its ends, however, the sizes of the hexagonal voids 264 vary. The width 264W1 of one hexagonal void 264, which is the distance between opposing vertices, is about 0.2973 inches (0.7551 cm). The width 264W2 of another hexagonal void 264 (namely, the center hexagonal void 264) is about 0.3494 inches (0.8874 cm).

Preferably, although not necessarily, each triangle in the pairs of triangle voids 266 is an equilateral triangle. Because the bottom portion 260*d* of the third back brace 260 slants slightly upward at its ends, however, the sizes of the triangles in the pairs of triangle voids 266 vary. The length 266L1 of each side of each triangle in one of the pairs of triangle voids 266 is about 0.1276 inches (0.3241 cm). The length 266L2 of each side of each triangle in another of the pairs of triangle voids 266 is about 0.1050 inches (0.2667 cm).

The spacing 267 between one side of one hexagonal void 264 and the facing side of an adjacent triangle in the pairs of triangle voids 266 is about 0.06 inches (0.1524 cm). Also preferably, the voids 262 are centered along the height of the side portions 260*c* of the third back brace 260. In the example illustrated in FIG. 6C, the tops of the hexagonal voids 264 and the tops of the pairs of triangle voids 266 are located a centering distance 268 of about 0.600 inches (0.1524 cm) below the top of the side portions 260*c*. The bottoms of the hexagonal voids 264 and the bottoms of the pairs of triangle voids 266 are located the same centering distance 268 of about 0.600 inches (0.1524 cm) above the bottom of the side portions 260*c*.

Figure 6D:
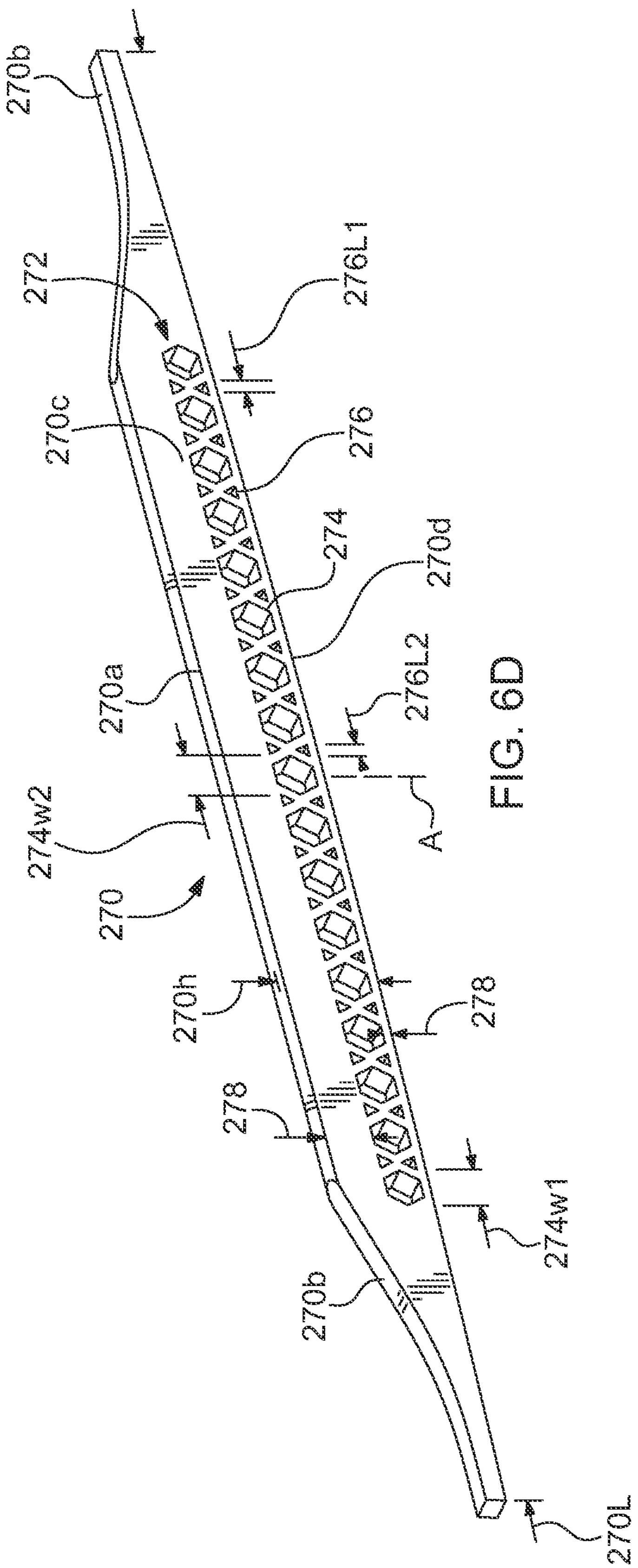
FIG. 6D is a perspective side view of the fourth (from the top) or bottom back brace shown in FIG. 6.

FIG. 6D is a perspective side view of the fourth back brace 270 shown in FIG. 6. Preferably made of an integral piece of wood, the fourth back brace 270 has a rounded center top portion 270*a* flanked by two substantially flat and tapered top portions 270*b*. The fourth back brace 270 also has opposing side portions 270*c* and a bottom portion 270*d* that is slightly slanted upward toward each end. For the embodiment shown in FIG. 6D, and for purposes of example only, the fourth back brace 270 has a length 270L of about 15.4001 inches (39.1162 cm) and a height 270H of about 0.6766 inches (1.7185 cm). As illustrated, the fourth back brace 270 has a plurality of voids 272 cut into and entirely through the side portions 270*c*. The voids 272 give the fourth back brace 270 a skeleton form. The number, size, shape, and location of the voids 272 are specifically predetermined to achieve a balance between the weight or mass of the fourth back brace 270 (reducing the weight or mass) and the functional contributions of the fourth back brace 270 to the back 18*b*.

In the embodiment of the fourth back brace 270 illustrated in FIG. 6D, the voids 272 include an alternating pattern of hexagonal voids 274 and pairs of triangle voids 276. As illustrated, the pattern is symmetrical about the central axis A and includes sixteen pairs of triangle voids 276 alternating between seventeen hexagonal voids 274. The pattern yields sixteen solid, integral X-shaped regions within the fourth back brace 270, with the upper triangle in the pairs of triangle voids 276 creating the top void in the X, the lower triangle in the pairs of triangle voids 276 creating the bottom void in the X, the left hexagonal void 274 creating the left side void in the X, and the right hexagonal void 274 creating the right side void in the X. Other patterns of voids 272 were investigated but were found to be inferior.

Preferably, although not necessarily, the hexagonal voids 274 are regular hexagons. Because the bottom portion 270*d* of the fourth back brace 270 slants slightly upward at its ends, however, the sizes of the hexagonal voids 274 vary. The width 274W1 of one hexagonal void 274, which is the distance between opposing vertices, is about 0.2640 inches (0.6705 cm). The width 274W2 of another hexagonal void 274 (namely, the center hexagonal void 274) is about 0.3491 inches (0.8867 cm).

Preferably, although not necessarily, each triangle in the pairs of triangle voids 276 is an equilateral triangle. Because the bottom portion 270*d* of the fourth back brace 270 slants slightly upward at its ends, however, the sizes of the triangles in the pairs of triangle voids 276 vary. The length 276L1 of each side of each triangle in one of the pairs of triangle voids 276 is about 0.1010 inches (0.2565 cm). The length 276L2 of each side of each triangle in another of the pairs of triangle voids 276 is about 0.0720 inches (0.1828 cm).

The spacing 277 between one side of one hexagonal void 274 and the facing side of an adjacent triangle in the pairs of triangle voids 276 is about 0.1800 inches (0.4572 cm). Also preferably, the voids 272 are centered along the height of the side portions 270*c* of the fourth back brace 270. In the example illustrated in FIG. 6D, the tops of the hexagonal voids 274 and the tops of the pairs of triangle voids 276 are located a centering distance 278 of about 0.600 inches (0.1524 cm) below the top of the side portions 270*c*. The bottoms of the hexagonal voids 274 and the bottoms of the pairs of triangle voids 276 are located the same centering distance 278 of about 0.600 inches (0.1524 cm) above the bottom of the side portions 270*c*.

Figure 7:
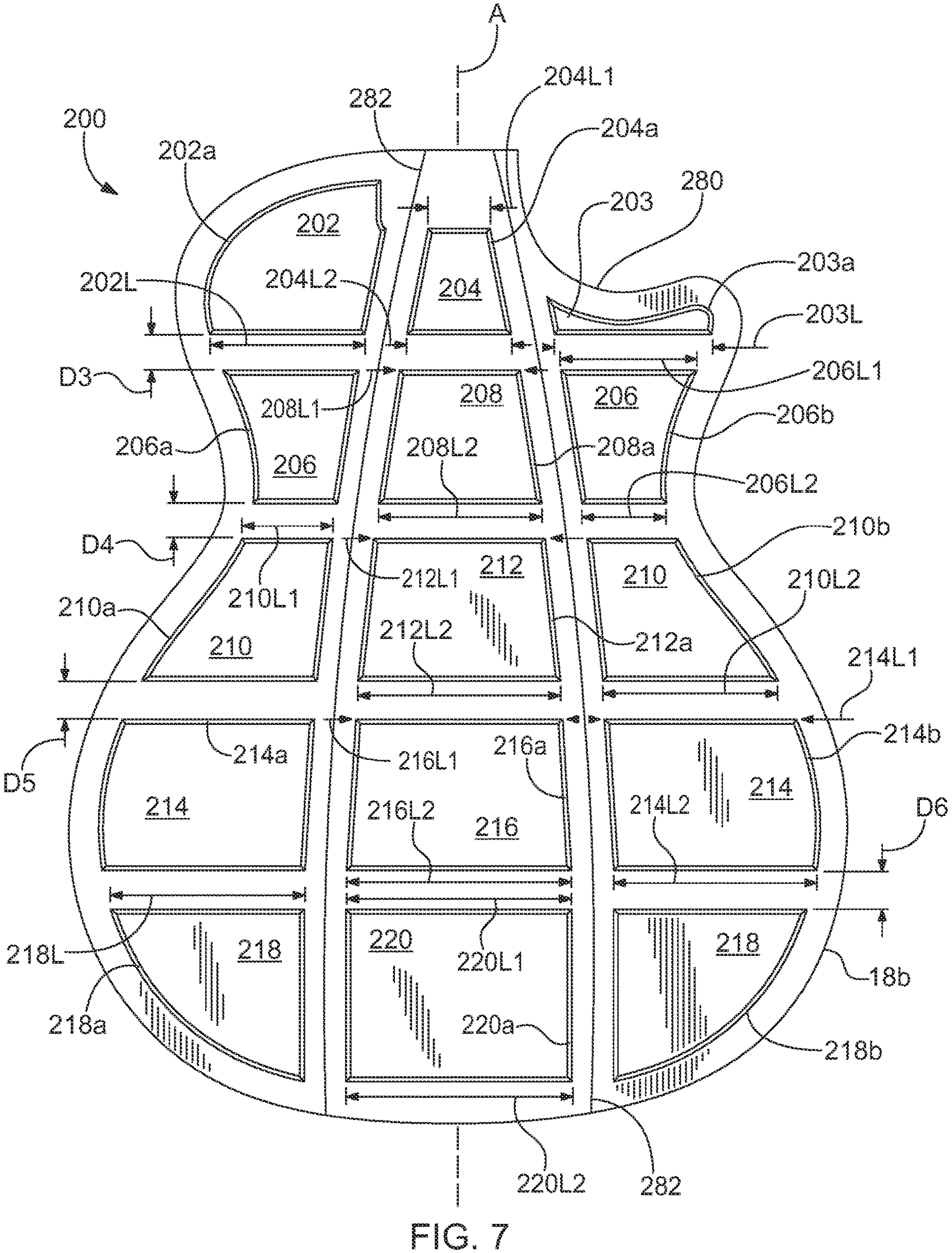
FIG. 7 is a plan view of the upper surface of a guitar back illustrating another embodiment of a sonic channel.

Highlighted in FIG. 7 is the upper surface of the rear plate (guitar bottom or back) 18*b* illustrating an alternative embodiment, which can be compared to the embodiment shown in FIG. 5, of a second sonic channel 200 formed in the back 18*b*. The sonic channel 200 is formed in the back 18*b* using any conventional manufacturing process. Mechanical cutting, laser cutting, and abrasive removal using an abrasive wheel are three example manufacturing processes, as would be known to an artisan. Routing is a preferred process to form the sonic channel 200 in the back 18*b*.

In the example embodiment shown in FIG. 7, as for the embodiment shown in FIG. 5, the sonic channel 200 of the back 18*b* is about 0.125±0.003 inches (0.3175±0.0076 cm) wide and about 0.030±0.003 inches (0.076±0.0076 cm) deep. The sonic channel 200 includes fifteen, separate, discrete sections, as illustrated, with each section defining an area or footprint on the back 18*b*. The fifteen sections are grouped substantially into five rows "R" and three columns "C."

The first section 202*a* of the sonic channel 200 is located in the top or first row (R1) and in the left or first column (C1). The first section 202*a* defines a substantially triangle or pie-shaped first area 202 with three legs. In the example illustrated, the first section 202*a* has a length 202L, which defines the extent of the substantially straight and horizontal first leg of the first section 202*a*, of about 3.164 inches (8.037 cm). A second leg of the first section 202*a* defines the width of the first section 202*a* and has two substantially straight portions connected and offset by a bend to accommodate the top center of the body 2 proximate the neck end of the body 2. A third leg of the first section 202*a* is located proximate the outer perimeter of the back 18*b* and is substantially curved to follow the contour of that outer perimeter.

The second section 203*a* of the sonic channel 200 is located in the top or first row (R1) and in the right or third column (C3). The second section 203*a* is shaped like a substantially flat rectangle with a substantially curved top surface to follow the contour of the cutout 280 in the outer perimeter of the back 18*b*. The first section 202*a* and the second section 203*a* are located on opposite sides of the common longitudinal axis A of the soundboard 18*a* and the back 18*b*. The second section 203*a* defines a second area 203. The second section 203*a* has a length 203L, which defines the extent of the substantially straight and horizontal bottom surface of the second section 203*a*, that is substantially the same as the length 202L of the first section 202*a*.

The third section 204*a* of the sonic channel 200 is located in the top or first row (R1) and in the middle or second column (C2). The third section 204*a* defines a substantially trapezoid-shaped third area 204 that is centered along the longitudinal axis A. In the example illustrated, the third section 204*a* has a maximum length 204L2, which defines the extent of the longer of the two substantially straight and parallel legs of the third section 204*a*, of about 2.157 inches (5.479 cm). The length 204L1 of the shorter of the two substantially straight and parallel legs of the third section 204*a* is about 1.288 inches (3.272 cm). Two substantially straight portions of the third section 204*a* angle inward and upward from the longer parallel leg to the shorter parallel leg.

The fourth section 206*a* of the sonic channel 200 is located in the second row (R2) and in the left or first column (C1). The fourth section 206*a* defines a substantially trapezoid-shaped fourth area 206 and is positioned under the first section 202*a*. In the example illustrated, the fourth section 206*a* has a maximum length 206L1, which defines the extent of the longer of the two substantially straight and parallel legs of the fourth section 206*a*, of about 2.769 inches (7.033 cm). The distance D3 between the longer of the two substantially straight and parallel legs of the fourth section 206*a* and the substantially straight and horizontal first leg of the first section 202*a* is about 0.728 inches (1.849 cm). The length 206L2 of the shorter of the two substantially straight and parallel legs of the fourth section 206*a* is about 1.719 inches (4.366 cm). The fourth section 206*a* has a substantially straight, non-parallel leg that runs along the longitudinal axis A. The other non-parallel leg of the fourth section 206*a* is located proximate the outer perimeter of the back 18*b* and is substantially curved to follow the contour of that outer perimeter.

The fifth section 206*b* of the sonic channel 200 is located in the second row (R2) and in the right or third column (C3). The fifth section 206*b* is the mirror image of the fourth section 206*a* of the sonic channel 200 and is positioned under the second section 203*a*. The fourth section 206*a* and the fifth section 206*b* are symmetrically located on opposite sides of the common longitudinal axis A of the soundboard 18*a* and the back 18*b*. Like the fourth section 206*a*, the fifth section 206*b* defines a substantially trapezoid-shaped fourth area 206.

The sixth section 208*a* of the sonic channel 200 is located in the second row (R2) and in the middle or second column (C2). The sixth section 208*a* is positioned under the third section 204*a*. The sixth section 208*a* defines a substantially trapezoid-shaped sixth area 208 that is centered along the longitudinal axis A. In the example illustrated, the sixth section 208*a* has a maximum length 208L2, which defines the extent of the longer of the two substantially straight and parallel legs of the sixth section 208*a*, of about 3.280 inches (8.331 cm). The length 208L1 of the shorter of the two substantially straight and parallel legs of the sixth section 208*a* is about 2.424 inches (6.157 cm). Two substantially straight portions of the sixth section 208*a* angle inward and upward from the longer parallel leg to the shorter parallel leg.

The seventh section 210*a* of the sonic channel 200 is located in the third row (R3) and in the left or first column (C1). The seventh section 210*a* defines a substantially trapezoid-shaped seventh area 210 and is positioned under the fourth section 206*a*. In the example illustrated, the seventh section 210*a* has a maximum length 210L2, which defines the extent of the longer of the two substantially straight and parallel legs of the seventh section 210*a*, of about 3.569 inches (9.065 cm). The length 210L1 of the shorter of the two substantially straight and parallel legs of seventh section 210*a* is about 1.832 inches (4.653 cm). The seventh section 210*a* has a substantially straight, non-parallel leg that runs along the longitudinal axis A. The other non-parallel leg of the seventh section 210*a* is located proximate the outer perimeter of the back 18*b* and is substantially curved to follow the contour of that outer perimeter. The distance D4 between the shorter of the two substantially straight and parallel legs of seventh section 210*a* and the shorter of the two substantially straight and parallel legs of the fourth section 206*a* is about 0.728 inches (1.849 cm).

The eighth section 210*b* of the sonic channel 200 is located in the third row (R3) and in the right or third column (C3). The eighth section 210*b* is the mirror image of the seventh section 210*a* of the sonic channel 200 and is positioned under the fifth section 206*b*. The seventh section 210*a* and the eighth section 210*b* are symmetrically located on opposite sides of the common longitudinal axis A of the soundboard 18*a* and the back 18*b*. Like the seventh section 210*a*, the eighth section 210*b* defines a substantially trapezoid-shaped seventh area 210.

The ninth section 212*a* of the sonic channel 200 is located in the third row (R3) and in the middle or second column (C2). The ninth section 212*a* is positioned under the sixth section 208*a*. The ninth section 212*a* defines a substantially trapezoid-shaped ninth area 212 that is centered along the longitudinal axis A. In the example illustrated, the ninth section 212*a* has a maximum length 212L2, which defines the extent of the longer of the two substantially straight and parallel legs of the ninth section 212*a*, of about 4.099 inches (10.411 cm). The length 212L1 of the shorter of the two substantially straight and parallel legs of the ninth section 212*a* is about 3.475 inches (8.827 cm). Two substantially straight portions of the ninth section 212*a* angle inward and upward from the longer parallel leg to the shorter parallel leg.

The tenth section 214*a* of the sonic channel 200 is located in the fourth row (R4) and in the left or first column (C1). The tenth section 214*a* defines a substantially trapezoid-shaped tenth area 214 and is positioned under the seventh section 210*a*. In the example illustrated, the tenth section 214*a* has a maximum length 214L2, which defines the extent of the longer of the two substantially straight and parallel legs of the seventh section 210*a*, of about 4.134 inches (10.500 cm). The length 214L1 of the shorter of the two substantially straight and parallel legs of the tenth section 214*a* is about 3.886 inches (9.870 cm). The tenth section

214*a* has a substantially straight, non-parallel leg that runs along the longitudinal axis A. The other non-parallel leg of tenth section 214*a* is located proximate the outer perimeter of the back 18*b* and is substantially curved to follow the contour of that outer perimeter. The distance D5 between the shorter of the two substantially straight and parallel legs of the tenth section 214*a* and the longer of the two substantially straight and parallel legs of the seventh section 210*a* is about 0.785 inches (1.994 cm).

The eleventh section 214*b* of the sonic channel 200 is located in the fourth row (R4) and in the right or third column (C3). The eleventh section 214*b* is the mirror image of the tenth section 214*a* of the sonic channel 200 and is positioned under the eighth section 210*b*. The tenth section 214*a* and the eleventh section 214*b* are symmetrically located on opposite sides of the common longitudinal axis A of the soundboard 18*a* and the back 18*b*. Like the tenth section 214*a*, the eleventh section 214*b* defines a substantially trapezoid-shaped tenth area 214.

The twelfth section 216*a* of the sonic channel 200 is located in the fourth row (R4) and in the middle or second column (C2). The twelfth section 216*a* is positioned under the ninth section 212*a*. The twelfth section 216*a* defines a substantially trapezoid-shaped twelfth area 216 that is centered along the longitudinal axis A. In the example illustrated, the twelfth section 216*a* has a maximum length 216L2, which defines the extent of the longer of the two substantially straight and parallel legs of the twelfth section 216*a*, of about 4.565 inches (11.595 cm). The length 216L1 of the shorter of the two substantially straight and parallel legs of the twelfth section 216*a* is about 4.227 inches (10.737 cm). Two substantially straight portions of the twelfth section 216*a* angle inward and upward from the longer parallel leg to the shorter parallel leg.

The thirteenth section 218*a* of the sonic channel 200 is located in the bottom or fifth row (R5) and in the left or first column (C1). The thirteenth section 218*a* defines a substantially triangle or pie-shaped thirteenth area 218 with three legs. In the example illustrated, the thirteenth section 218*a* has a length 218L, which defines the extent of the substantially straight and horizontal first leg of the thirteenth section 218*a*, of about 3.948 inches (10.028 cm). A second leg of the thirteenth section 218*a* defines the width of the thirteenth section 218*a* is substantially straight and vertical. A third leg of the thirteenth section 218*a* is located proximate the outer perimeter of the back 18*b* and is substantially curved to follow the contour of that outer perimeter. The distance D6 between the substantially straight and horizontal first leg of the thirteenth section 218*a* and the longer of the two substantially straight and parallel legs of the tenth section 214*a* is about 0.785 inches (1.994 cm).

The fourteenth section 218*b* of the sonic channel 200 is located in the bottom or fifth row (R5) and in the right or third column (C3). The fourteenth section 218*b* is the mirror image of the thirteenth section 218*a* of the sonic channel 200 and is positioned under the eleventh section 214*b*. The thirteenth section 218*a* and the fourteenth section 218*b* are symmetrically located on opposite sides of the common longitudinal axis A of the soundboard 18*a* and the back 18*b*. Like the thirteenth section 218*a*, the fourteenth section 218*b* defines a substantially triangle or pie-shaped thirteenth area 218.

The fifteenth section 220*a* of the sonic channel 200 is located in the bottom or fifth row (R5) and in the middle or second column (C2). The fifteenth section 220*a* is positioned under the twelfth section 216*a*. The fifteenth section 220*a* defines a substantially trapezoid-shaped fifteenth area 220 that is centered along the longitudinal axis A. In the example illustrated, the fifteenth section 220*a* has a maximum length 220L1, which defines the extent of the longer of the two substantially straight and parallel legs of the fifteenth section 220*a*, of about 4.608 inches (11.704 cm). The length 220L2 of the shorter of the two substantially straight and parallel legs of the fifteenth section 220*a* is about 4.591 inches (11.661 cm). Two substantially straight portions of the fifteenth section 220*a* angle inward and downward from the longer parallel leg to the shorter parallel leg.

Finally, as shown in FIG. 7, the sonic channel 200 includes two slightly curved longboard channels 282. Each longboard channel 282 extends the full length of the back 18*b*, starting at the top of the back 18*b* proximate the neck end of the body 2 and ending at the bottom of the back 18*b*. The first longboard channel 282 and the second longboard channel 282 are symmetrically located on opposite sides of the common longitudinal axis A of the soundboard 18*a* and the back 18*b*. Thus, the longboard channels 282 combine to form a center wedge on the back 18*b* that is shaped like a "longboard" surfboard or a "longboard" skateboard.

Figure 8:
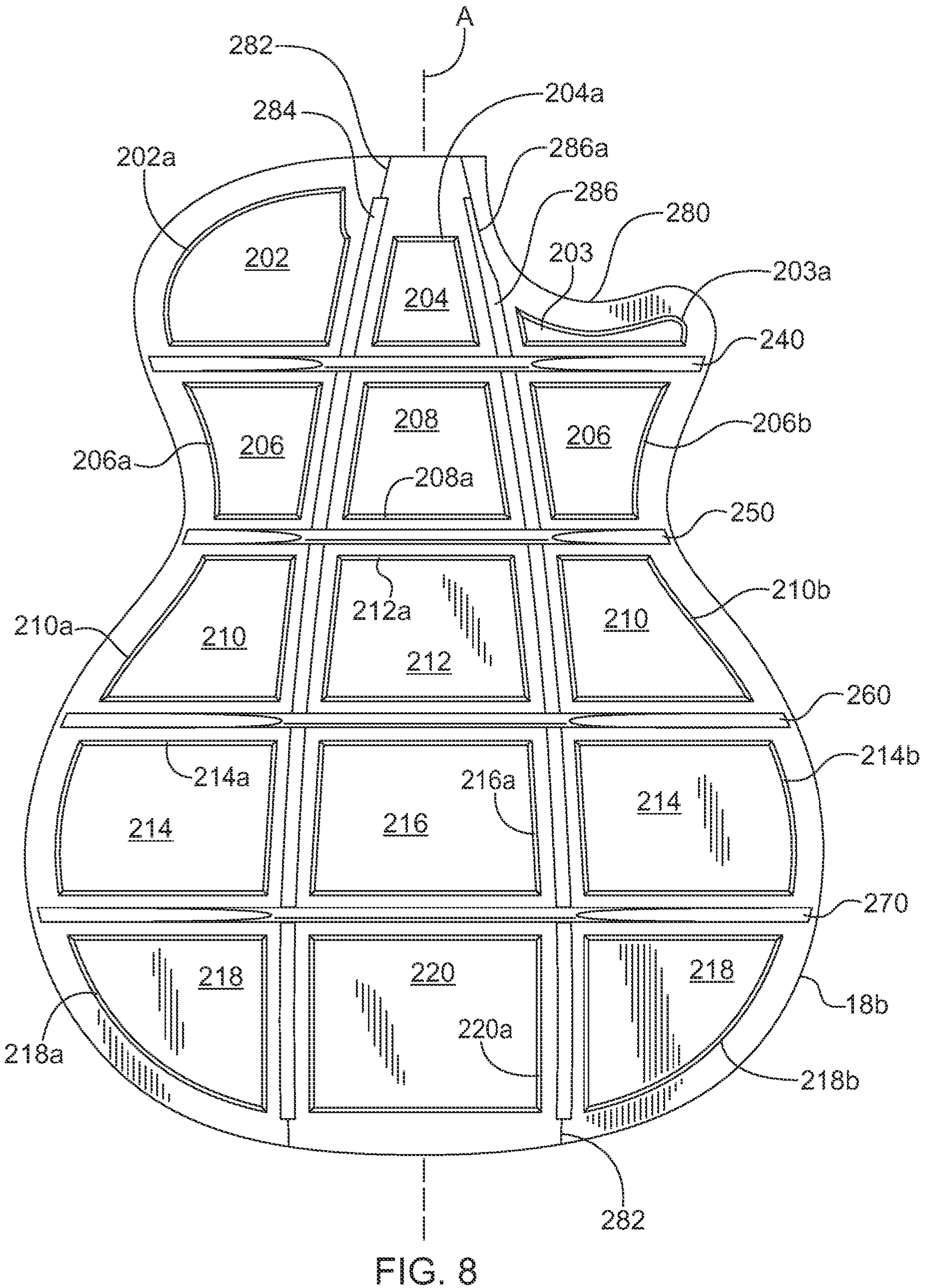
FIG. 8 is a plan view of the upper surface of the guitar back shown in FIG. 7 to which has been added another embodiment of skeletonized back braces.

FIG. 8 is a plan view of the upper surface of the guitar back 18*b* shown in FIG. 7 to which has been added an alternative embodiment, which can be compared to the embodiment shown in FIG. 6, of skeletonized back braces. Like the back bracing system shown in FIG. 6, the back bracing system shown in FIG. 8 includes four back braces: the first back brace 240, the second back brace 250, the third back brace 260, and the fourth back brace 270. More details about the construction of the four back braces 240, 250, 260, and 270 are provided above in the context of FIGS. 6A, 6B, 6C, and 6D, respectively.

In addition, the back bracing system shown in FIG. 8 includes a first longboard strip 284 and a second longboard strip 286. The first longboard strip 284 has the same shape as and is positioned over the left longboard channel 282 and the second longboard strip 286 has the same shape as and is positioned over the right longboard channel 282. Thus, the first longboard strip 284 and the second longboard strip 286 are symmetrically located on opposite sides of the common longitudinal axis A of the soundboard 18*a* and the back 18*b*. Each longboard strip 284, 286 extends along almost but not quite all (e.g., 90-95%) of the longitudinal extent of the respective longboard channel 282. More specifically, each longboard strip 284, 286 starts just below the top of the back 18*b* proximate the neck end of the body 2 and ends just above the bottom of the back 18*b*. The second longboard strip 286 may have a scallop 286*a* to accommodate the cutout 280 in the body 2.

The back 18*b* with the second sonic channel 200 and skeletonized back bracing is strong and stable. The sonic channel 200 and skeletonized back bracing result in greater flexibility in strategic areas of the back 18*b* to produce a desired tonal effect. The sonic channel 200 and skeletonized back bracing achieve an improvement in tonal response in comparison to conventionally built acoustic stringed instruments. The sonic channel 200 and skeletonized back bracing can be discretely applied to different acoustic stringed instrument body shapes and bracing styles. Another advantage relative to the known art is that the sonic channel 200 and skeletonized back bracing target specific regions of the back 18*b* to maximize the desired tonal effect. The sonic channel 200 and skeletonized back bracing allow for tonal optimization based on body shape.

D. Testing

Test were conducted on various standard (or control) guitars and on prototype guitars using different sonic channel and bracing configurations to compare tonal and structural characteristics. Specifically, sound tests were done by strumming the instrument consistently, recording the sound produced, and analyzing the sound in a spectrograph that displays the frequency, amplitude, sustain, and harmonic content. Deflection tests were conducted using a deflection fixture; all deflection test results fell within an acceptable range as exhibited by standard production model guitars.

Figure 9:
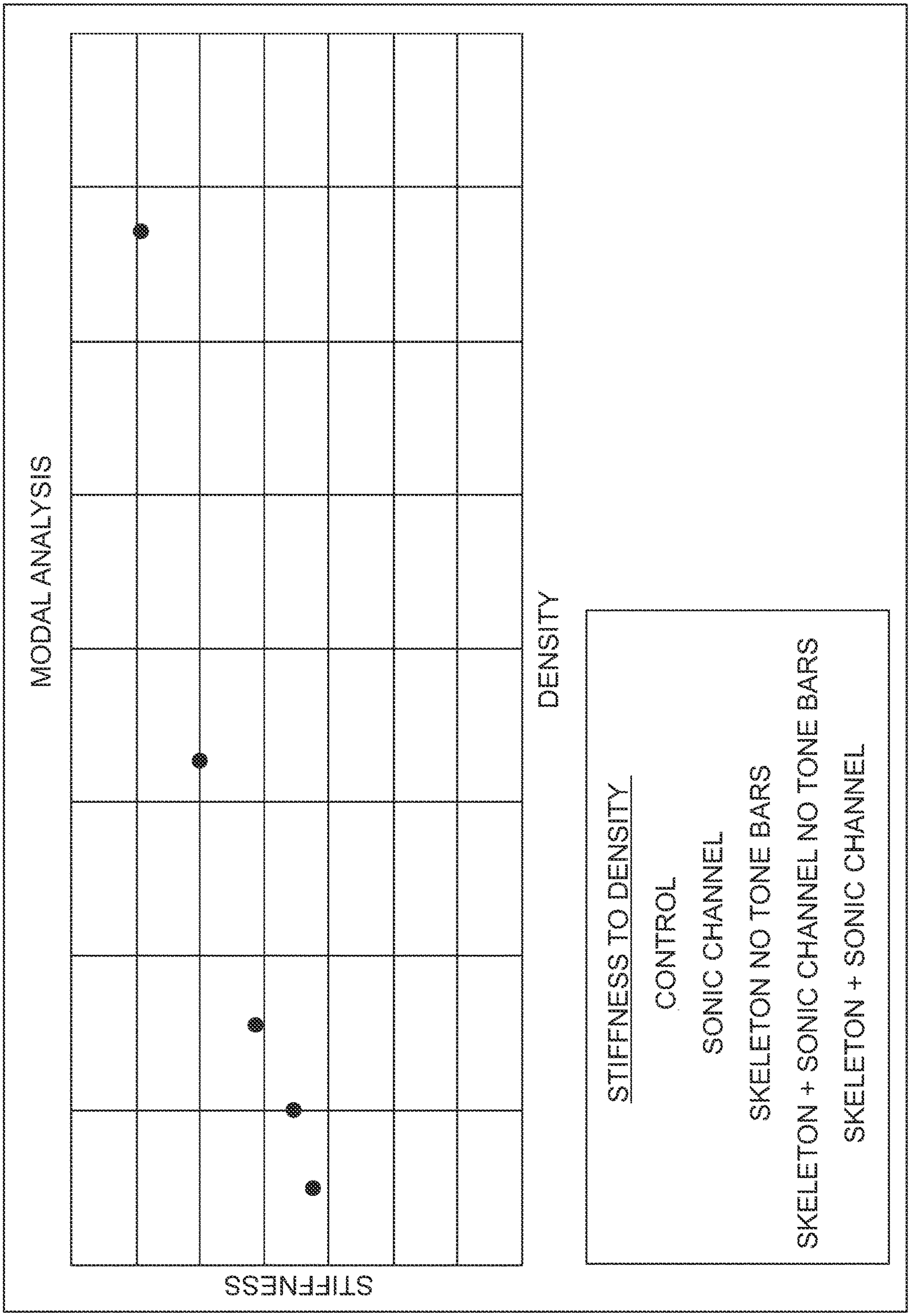
FIG. 9 is a graph illustrating a modal analysis based on tests done on control and prototype guitars.

FIG. 9 is a graph illustrating a modal analysis based on tests done on the control and prototype guitars. Definitions of the parameters used in modal analysis follow. "Stiffness" is the extent to which an object resists deformation in response to an applied force. "Mass" refers to an intrinsic property of an object. In everyday usage, mass and "weight" are often used interchangeably and, in a constant gravitational field, the weight of an object is proportional to its mass. "Volume" is a measure of the three-dimensional space occupied by the object. "Density" (volumetric mass density or specific mass) is the mass per unit of volume of that object. In mathematics, density is defined as mass divided by volume: $\rho=m/V$, where $\rho$ is the density, m is the mass, and V is the volume.

Modal analysis is a standard technique, well-known to an artisan, that studies the dynamic properties of systems such as musical instruments in the frequency domain. Modal analysis uses the overall mass and stiffness of an object to find the various periods at which the object will naturally resonate. It is desirable to calculate modal parameters (natural frequency, damping rate, and mode shape) because those parameters have a substantial effect on the tone and sound power desired for a musical instrument. Once a set of modes has been calculated for the instrument, the response at any frequency (within certain bounds) to many inputs at many points with different time histories can be calculated by superimposing the result from each mode.

A modal analysis calculates the undamped natural modes of an object, such as a musical instrument and more specifically a guitar, characterized by their modal frequency and mode shape. These modes are numbered, from 1, in order of increasing frequency. An object will vibrate around its undeformed shape with a certain frequency which depends on its mass and stiffness. Modal analysis is the analysis to find this frequency. Increasing the natural frequency requires an increase to stiffness or a decrease to mass. Increasing the stiffness of the mode-shape or decreasing the mass of the mode shape will increase the natural frequency of the mode.

FIG. 9 depicts the modal analysis for five, separate guitars: (1) a control guitar; (2) a prototype guitar having the sonic channel 100 and the sonic channel 200 but no bracing systems; (3) a prototype guitar having only the skeleton bracing and no other bracing or either the sonic channel 100 or the sonic channel 200; (4) a prototype guitar having the sonic channel 100, the sonic channel 200, and the skeleton bracing but no other bracing; and (5) a prototype guitar having the sonic channel 100, the sonic channel 200, and the full bracing systems (on the soundboard 18*a* and the back 18) described above. The graph shown in FIG. 9 plots a modal analysis, stiffness versus density, for the five guitars that were tested in order from left to right (thus, the control guitar is the left-most point and prototype guitar having the sonic channel 100, the sonic channel 200, and the full bracing system is the right-most point). Clearly, the prototype guitar having the sonic channel 100, the sonic channel 200, and the full bracing system offers the highest amounts of both stiffness and density, avoiding a tradeoff between those two parameters.

Figure 10:
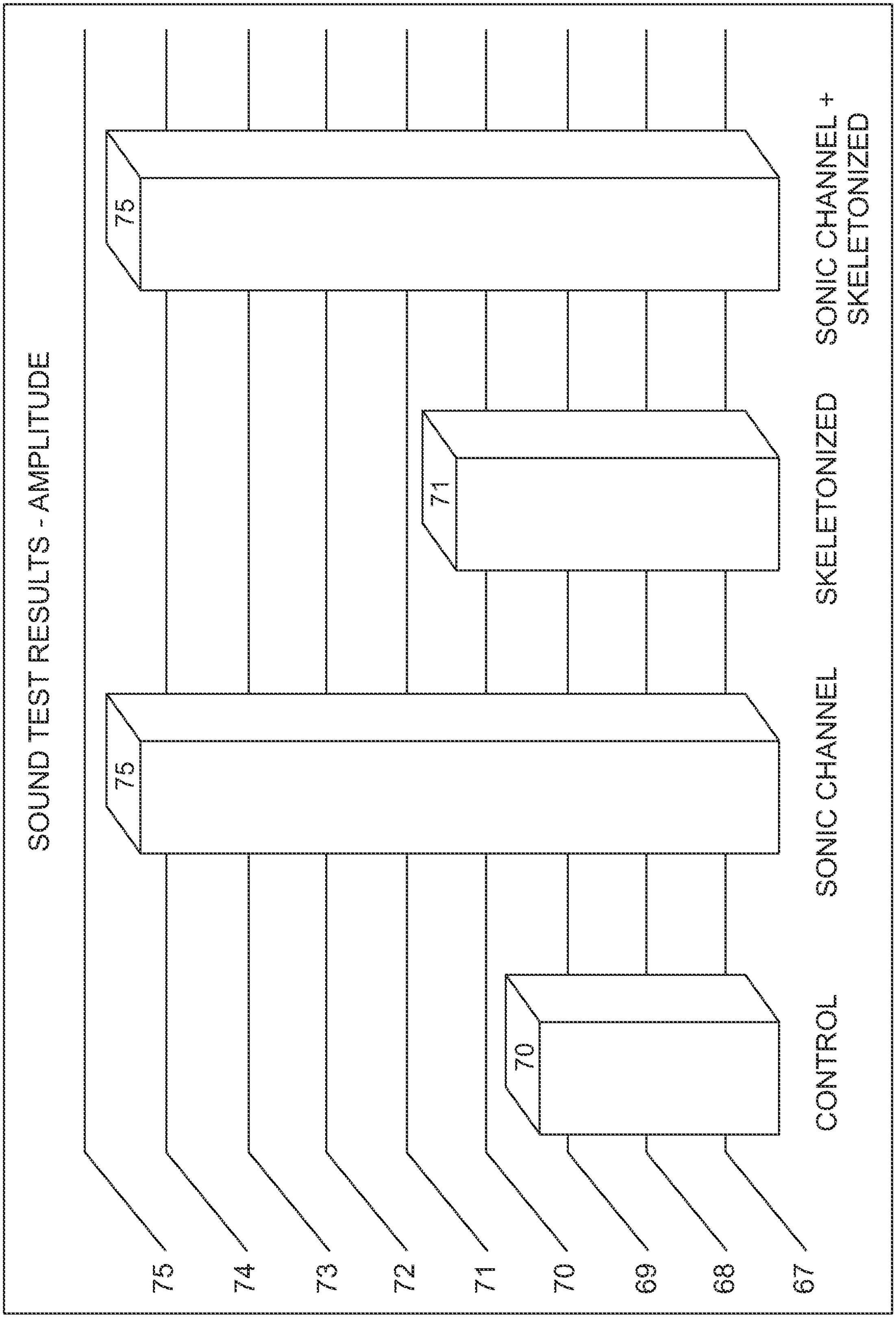
FIG. 10 is a graph illustrating sound test results (amplitude) based on tests done on control and prototype guitars.

FIG. 10 is a graph illustrating sound test results (amplitude) based on tests done on the control and prototype guitars. Sound is measured in decibels, dB, which is the most common unit to measure loudness. The unit measures the amplitude of a sound wave, i.e., the highest extent of a vibration from a position of equilibrium. In simple words, it is the pressure or forcefulness of the sound or the "intensity" of sound that is represented in dB. The human ear is sensitive to sounds ranging from 0 dB (eerie silence) to about 130 dB (painfully loud).

FIG. 10 depicts the amplitude analysis for four, separate guitars: (1) the control guitar; (2) the prototype guitar having the sonic channel 100 and the sonic channel 200 but no bracing systems; (3) the prototype guitar having only the skeleton bracing and no other bracing or either the sonic channel 100 or the sonic channel 200; and (4) the prototype guitar having the sonic channel 100, the sonic channel 200, and the full bracing systems (on the soundboard 18*a* and the back 18*b*) described above. The prototype guitar having the sonic channel 100 and the sonic channel 200 but no bracing systems and the prototype guitar having the sonic channel 100, the sonic channel 200, and the full bracing system each achieved the highest amplitude of about 75 dB. These results indicate that the sonic channel 100 and the sonic channel 200 are most important to enhancing the amplitude.

Figure 11:
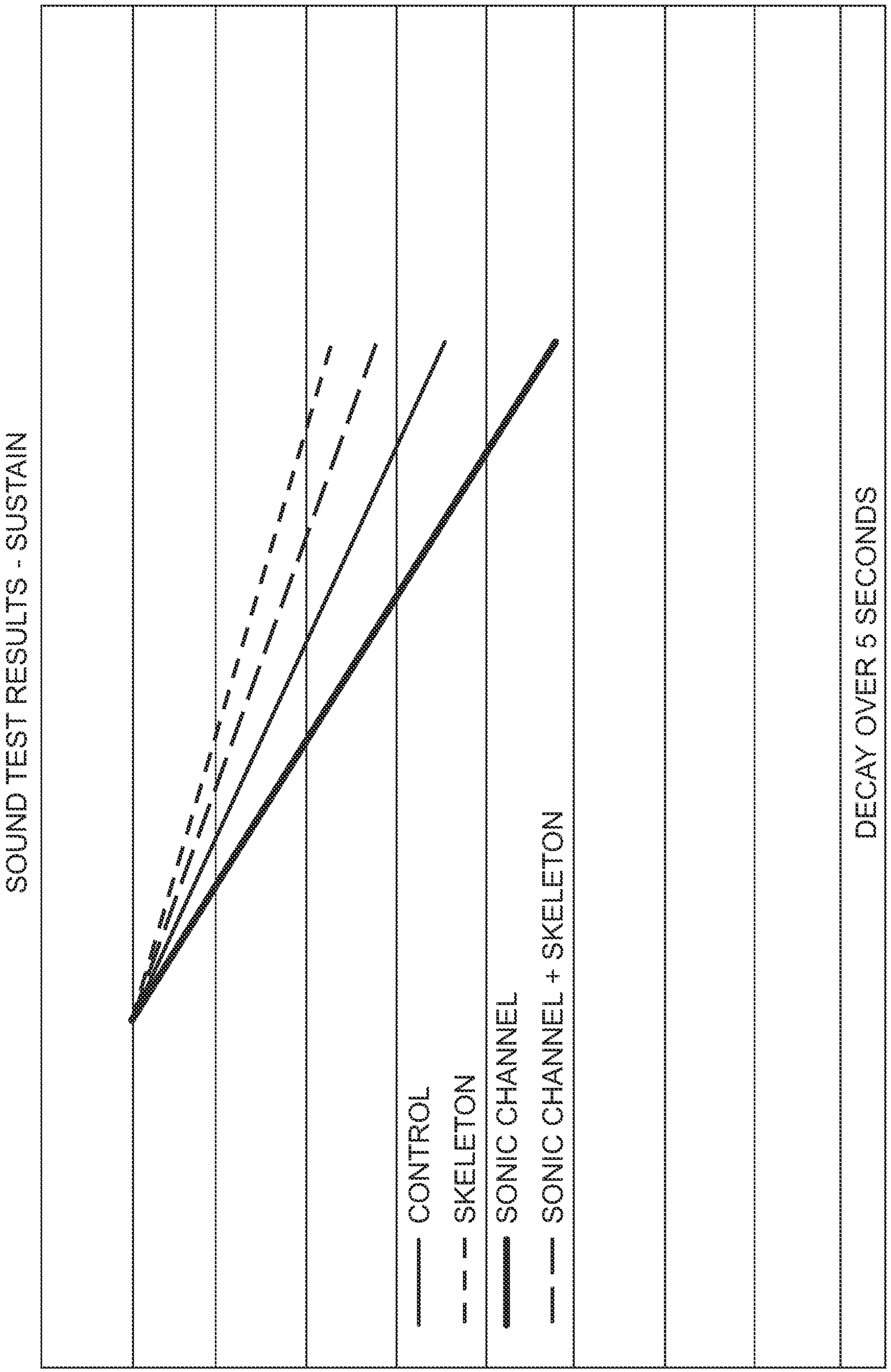
FIG. 11 is a graph illustrating sound test results (sustain) based on tests done on control and prototype guitars.

FIG. 11 is a graph illustrating sound test results (sustain) based on tests done on the control and prototype guitars. Put simply, sustain refers to how long a period of time that a note rings out on the guitar. This characteristic is related to how long the strings vibrate. The longer it takes for the vibrations to disperse, the better the sustain will be. Therefore, in order to increase the sustain, a luthier should try to make the strings vibrate for longer periods of time.

FIG. 11 depicts the sustain analysis (namely, decay over 5 seconds) for four, separate guitars: (1) the control guitar; (2) the prototype guitar having the sonic channel 100 and the sonic channel 200 but no bracing systems; (3) the prototype guitar having only the skeleton bracing and no other bracing or either the sonic channel 100 or the sonic channel 200; and (4) the prototype guitar having the sonic channel 100, the sonic channel 200, and the full bracing systems (on the soundboard 18*a* and the back 18*b*) described above. The prototype guitar having only the skeleton bracing offered the best sustain. The prototype guitar having the sonic channel 100 and the sonic channel 200 but no bracing systems offered the worst sustain. These results indicate that the skeleton bracing systems are most important to enhancing the sustain, and that the sonic channels require a tradeoff or balance between amplitude and sustain.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A musical instrument having a body defining a sound chamber for the musical instrument, the body comprising:

a soundboard;

a back defining an inside surface, the back including a first sonic channel formed in the inside surface and having a plurality of separate, discrete, substantially polygonal-shaped sections, each section defining a respective area of the inside surface of the back corresponding to the shape of the polygonal-shaped section; and a lateral sidewall connecting the soundboard and the back.

2. The musical instrument according to claim 1, wherein the plurality of substantially polygonal-shaped sections of the back are grouped into five rows and three columns.

3. The musical instrument according to claim 1, wherein the back includes multiple back braces with at least one back brace skeletonized.

4. The musical instrument according to claim 3, wherein the at least one skeletonized back brace has an alternating pattern of hexagonal voids and pairs of triangle voids that yields solid, integral X-shaped regions within the skeletonized back brace.

5. The musical instrument according to claim 3, wherein at least one of the multiple back braces is bounded by the first sonic channel.

6. The musical instrument according to claim 5, wherein all of the multiple back braces are bounded by the first sonic channel.

7. The musical instrument according to claim 1, wherein the body is made of a domestic hardwood.

8. The musical instrument according to claim 1, wherein the musical instrument is a guitar.

9. The musical instrument according to claim 1, wherein the back has a top, a bottom, a length extending between the top and the bottom, and a longitudinal axis and the first sonic channel includes two slightly curved longboard channels that each extend along the length of the back and that are symmetrically located on opposite sides of the longitudinal axis, the longboard channels combining to form a center wedge on the back that is shaped like a "longboard" surfboard or a "longboard" skateboard.

10. The musical instrument according to claim 9, wherein the back includes a first longboard strip that has the same shape as and is positioned over one longboard channel and a second longboard strip that has the same shape as and is positioned over the other longboard channel.

11. The musical instrument according to claim 1, wherein the soundboard includes multiple braces with at least one brace skeletonized.

12. The musical instrument according to claim 11, wherein the soundboard includes a skeletonized top brace and two skeletonized X-braces.

13. The musical instrument according to claim 12, wherein the skeletonized top brace includes an orifice centrally located in the top brace and configured to receive a truss rod.

14. The musical instrument according to claim 11, wherein the at least one skeletonized brace has an alternating pattern of hexagonal voids and pairs of triangle voids that yields solid, integral X-shaped regions within the skeletonized brace.

15. The musical instrument according to claim 14, wherein the at least one skeletonized brace further includes a hexagonal orifice centrally located in the at least one skeletonized brace and configured to receive a truss rod.

16. The musical instrument according to claim 11, wherein the multiple braces include X-braces, a bridge plate, a tone bar, a fretboard plate, a top brace, an angled brace, a horizontal brace, and a fan brace.

17. The musical instrument according to claim 11, wherein at least one of the multiple braces is bounded by a second sonic channel.

18. The musical instrument according to claim 17, wherein all of the multiple braces are bounded by the second sonic channel.

19. A musical instrument having a body defining a sound chamber for the musical instrument, the body comprising:

a back having a top, a bottom, a length extending between the top and the bottom, a longitudinal axis, multiple back braces with at least one back brace skeletonized, a first sonic channel including a plurality of substantially polygonal-shaped sections and two slightly curved longboard channels that each extend along the length of the back and that are symmetrically located on opposite sides of the longitudinal axis, the longboard channels combining to form a center wedge on the back that is shaped like a "longboard" surfboard or a "longboard" skateboard, a first longboard strip that has the same shape as and is positioned over one longboard channel, and a second longboard strip that has the same shape as and is positioned over the other longboard channel;

a soundboard having a second sonic channel and multiple braces with at least one brace skeletonized, the at least one skeletonized brace including an alternating pattern of hexagonal voids and pairs of triangle voids that yields solid integral X-shaped regions within the skeletonized brace, the at least one skeletonized brace further including a hexagonal orifice centrally located in the at least one skeletonized brace and configured to receive a truss rod; and a lateral sidewall connecting the soundboard and the back.

20. The musical instrument according to claim 19, wherein the multiple braces of the soundboard further include two skeletonized X-braces, at least one of the two skeletonized X-braces having a notch at a point where the X-braces cross so that they fit over or seat into one another.

* * * * *